United States Patent
Kou et al.

(10) Patent No.: US 12,551,286 B2
(45) Date of Patent: *Feb. 17, 2026

(54) SURGICAL PLANNING, SURGICAL NAVIGATION AND IMAGING SYSTEM

(71) Applicant: EagleView Imaging, Inc., Troy, MI (US)

(72) Inventors: Zhifeng Kou, Troy, MI (US); Yi Zhong, Troy, MI (US); Zhe Zeng, Troy, MI (US)

(73) Assignee: Eagleview Imaging, Inc., Troy, MI (US)

( * ) Notice: Subject to any disclaimer, the term of this patent is extended or adjusted under 35 U.S.C. 154(b) by 1115 days.

This patent is subject to a terminal disclaimer.

(21) Appl. No.: 17/390,905

(22) Filed: Jul. 31, 2021

(65) Prior Publication Data

US 2021/0353361 A1 Nov. 18, 2021

Related U.S. Application Data

(63) Continuation-in-part of application No. PCT/US2020/025677, filed on Mar. 30, 2020.

(Continued)

(51) Int. Cl.
*A61B 34/10* (2016.01)
*A61B 5/055* (2006.01)
(Continued)

(52) U.S. Cl.
CPC .............. *A61B 34/20* (2016.02); *A61B 5/055* (2013.01); *A61B 34/10* (2016.02); *A61B 90/36* (2016.02);
(Continued)

(58) Field of Classification Search
CPC .................. A61B 34/10; A61B 34/20; G06T 2207/10021; H04N 13/128; H04N 13/261
See application file for complete search history.

(56) References Cited

U.S. PATENT DOCUMENTS 7,376,903 B2 5/2008 Morita et al.
8,285,011 B2 10/2012 Chen et al.
(Continued)

OTHER PUBLICATIONS

Implementing stereoscopic 3D in your applications; 2010—Gateau; (Year: 2010).*

(Continued)

*Primary Examiner* — Luis Perez-Fuentes
(74) *Attorney, Agent, or Firm* — Brooks Kushman P.C.

(57) ABSTRACT

A computer-implemented method for adjustable three-dimensional (3D) rendering of locations in a subject includes a step of receiving image data having a discrete spatial resolution for white matter tracts in a subject where the image data is generated by magnetic diffusion imaging. A first stereoscopic image is rendered on a display from the image data. The first stereoscopic image includes image parallax, which allows three-dimensional viewing. An input is received from a pointing device or a hand gesture that enables manipulation of the first stereoscopic image while maintaining proper three-dimensional spatial relationships. The pointing device interacts with the first stereoscopic image in three-dimensional space with six degrees of freedom.

25 Claims, 23 Drawing Sheets

Related U.S. Application Data

(60) Provisional application No. 62/826,857, filed on Mar. 29, 2019.

(51) Int. Cl.

| | |
|---|---|
| *A61B 34/20* | (2016.01) |
| *A61B 90/00* | (2016.01) |
| *G01R 33/563* | (2006.01) |
| *G02B 27/01* | (2006.01) |
| *G06F 3/01* | (2006.01) |
| *G06T 3/40* | (2006.01) |
| *G06T 3/60* | (2006.01) |
| *G06T 7/11* | (2017.01) |
| *G06T 15/08* | (2011.01) |

(52) U.S. Cl.
CPC ..... *G01R 33/56341* (2013.01); *G02B 27/017* (2013.01); *G06F 3/012* (2013.01); *G06F 3/013* (2013.01); *G06T 3/40* (2013.01); *G06T 3/60* (2013.01); *G06T 7/11* (2017.01); *G06T 15/08* (2013.01); *A61B 2034/101* (2016.02); *A61B 2034/102* (2016.02); *A61B 2034/105* (2016.02); *A61B 2034/107* (2016.02); *A61B 2034/2057* (2016.02); *A61B 2034/2068* (2016.02); *A61B 2090/374* (2016.02); *A61B 2090/3762* (2016.02); *A61B 2090/378* (2016.02); *G06T 2207/10021* (2013.01); *G06T 2207/10081* (2013.01); *G06T 2207/10088* (2013.01); *G06T 2207/10104* (2013.01); *G06T 2207/10132* (2013.01); *G06T 2207/30004* (2013.01); *G06T 2207/30008* (2013.01); *G06T 2207/30101* (2013.01)

(56) References Cited

U.S. PATENT DOCUMENTS

| | | | |
|---|---|---|---|
| 8,805,034 B2 | 8/2014 | Lehmann et al. | |
| 8,860,714 B2 | 10/2014 | Sakuragi | |
| 9,201,568 B2 | 12/2015 | Chavez et al. | |
| 9,225,969 B2* | 12/2015 | Aguirre-Valencia | ... G06T 15/20 |
| 9,354,718 B2 | 5/2016 | Vesely et al. | |
| 9,384,528 B2 | 7/2016 | Aguirre-Valencia et al. | |
| 9,595,127 B2 | 3/2017 | Champion et al. | |
| 9,600,138 B2 | 3/2017 | Thomas et al. | |
| 9,848,186 B2* | 12/2017 | Aguirre-Valencia | ........................ H04N 13/383 |
| 9,956,054 B2* | 5/2018 | Aguirre-Valencia | ........................ H04N 13/30 |
| 10,250,864 B2* | 4/2019 | Barkatullah | ......... H04N 13/128 |
| 11,348,257 B2* | 5/2022 | Lang | ...................... A61B 34/25 |
| 11,432,828 B1* | 9/2022 | Lang | ...................... G16H 70/20 |
| 11,727,581 B2* | 8/2023 | Lang | ...................... A61B 90/53 345/8 |
| 11,751,944 B2* | 9/2023 | Lang | ...................... A61B 5/05 606/130 |
| 11,801,114 B2* | 10/2023 | Lang | ...................... A61B 90/98 |
| 12,035,925 B2* | 7/2024 | Lang | ...................... G16H 40/63 |
| 2005/0203367 A1 | 9/2005 | Ahmed et al. | |
| 2006/0239540 A1 | 10/2006 | Serra et al. | |
| 2007/0236514 A1 | 10/2007 | Agusanto et al. | |
| 2011/0190633 A1 | 8/2011 | Kawagishi et al. | |
| 2011/0224551 A1 | 9/2011 | Barnard et al. | |
| 2013/0009957 A1 | 1/2013 | Arakita | |
| 2014/0303486 A1 | 10/2014 | Baumgartner et al. | |
| 2016/0182877 A1 | 6/2016 | Deluca | |
| 2016/0381256 A1 | 12/2016 | Aguirre-Valencia | |
| 2017/0367771 A1 | 12/2017 | Tako et al. | |
| 2018/0161178 A1 | 6/2018 | Bettenga | |
| 2018/0284969 A1 | 10/2018 | Welker et al. | |
| 2018/0303558 A1 | 10/2018 | Thomas | |
| 2021/0353371 A1* | 11/2021 | Kou | ....................... A61B 90/37 |

OTHER PUBLICATIONS

Implementing stereoscopic 3D in your applications; Gateau; 2010; (Year: 2010).*

State of the art in stereoscopic and autostereoscopic displays; 2011; (Year: 2011).*

3D optical microscopy for orthopedic implants; Bruker—2016; (Year: 2016).*

Mori, S. et al., "MRI Atlas of Human White Matter," 2005, 34 pgs.

Raslan, O. et al., "Stereoscopic Visualization of Diffusion Tensor Imaging Data: A Comparative Survey of Visualization Techniques," Radiology Research and Practice, 2013, Article ID 780916, 10 pgs.

International Search Report dated Jul. 15, 2020 for PCT/US2020/025677 filed Mar. 30, 2020, 23 pgs.

Non-Final Office Action dated Sep. 17, 2024 for U.S. Appl. No. 17/390,906, 18 pgs.

* cited by examiner

SURGICAL PLANNING, SURGICAL NAVIGATION AND IMAGING SYSTEM

CROSS-REFERENCE TO RELATED APPLICATIONS

This application is a continuation-in-part of PCT Appln. No. PCT/US2020/025677 filed Mar. 30, 2020, which claims the benefit of U.S. Provisional Application No. 62/826,857 filed Mar. 29, 2019, the disclosures of which are hereby incorporated in their entirety by reference herein.

TECHNICAL FIELD

In at least one aspect, the present disclosure relates to medical imaging systems and their application to surgical planning and surgical navigation.

BACKGROUND

Medical imaging by such techniques as magnet resonance imaging, CAT scans, and p is an important diagnostic tool. As imaging and computer technological advance, additional diagnostic information because available from these techniques.

SUMMARY

In at least one aspect, the present invention provides a computer-implemented method for adjustable three-dimensional (3D) rendering of locations in a subject. The computer-implemented method includes a step of receiving image data having a discrete spatial resolution for white matter tracts in a subject where the image data is generated by diffusion imaging. A first stereoscopic image is rendered on a display or head-mounted display(s) or a pair of displays from the image data. The first stereoscopic image includes image parallax, which allows three-dimensional viewing. An input is received from a pointing device or a hand gesture that allows manipulation of the first stereoscopic image while maintaining proper three-dimensional spatial relationships. The pointing device interacts with the first stereoscopic image in three-dimensional space with six degrees of freedom.

In another aspect, a computer-implemented method for the adjustable rendering of locations in a subject is provided. The computer-implemented method includes a step of receiving image data having a discrete spatial resolution for a location in a subject. One or more stereoscopic images are rendered on a display or head-mounted display(s) from the image data where the stereoscopic images include image parallax. One or more two-dimensional images corresponding to predetermined slices in the first stereoscopic image are also rendered on the display. The stereoscopic images are updated to reflect changes made to the two-dimensional images. Similarly, the two-dimensional images are updated to reflect changes made to the stereoscopic images. Characteristically, changes to the first stereoscopic image are made with the assistance of a pointing device interacting with the first stereoscopic image in three-dimensional space with six degrees of freedom.

In another aspect, a computer-implemented method for adjustable three-dimensional (3D) rendering for surgical assistance is provided. The computer-implemented method includes a step of receiving image data having a discrete spatial resolution for medical images in a subject. At least one stereoscopic image is rendered on a display or head-mounted display(s) from the image data. The stereoscopic images include image parallax to allow 3D viewing. An input is received from a probe that allows rendering of the probe in the stereoscopic images. The probe also allows manipulation of the stereoscopic images in three-dimensional space while maintaining proper three-dimensional spatial relationships. Characteristically, the probe interacts with the first stereoscopic image in three-dimensional space with six degrees of freedom.

In still another aspect, computer imaging systems implement the computer-implemented methods set forth herein are also provided. The computer imaging systems include a computer processing component and a display. The computer processing component is operable to execute the steps of the computer-implemented methods.

In still another aspect, the stereoscopic images rendered by the methods herein are viewable with a head-mounted display for virtual or augmented reality or stereoscopic display and/or with stereoscopic glasses that have fiducials allowing position and orientation tracking of the stereoscopic glasses.

BRIEF DESCRIPTION OF THE DRAWINGS

FIG. 5B illustrates the application of a directional container that in the form of a rectangular box.

DETAILED DESCRIPTION

Figure 1:
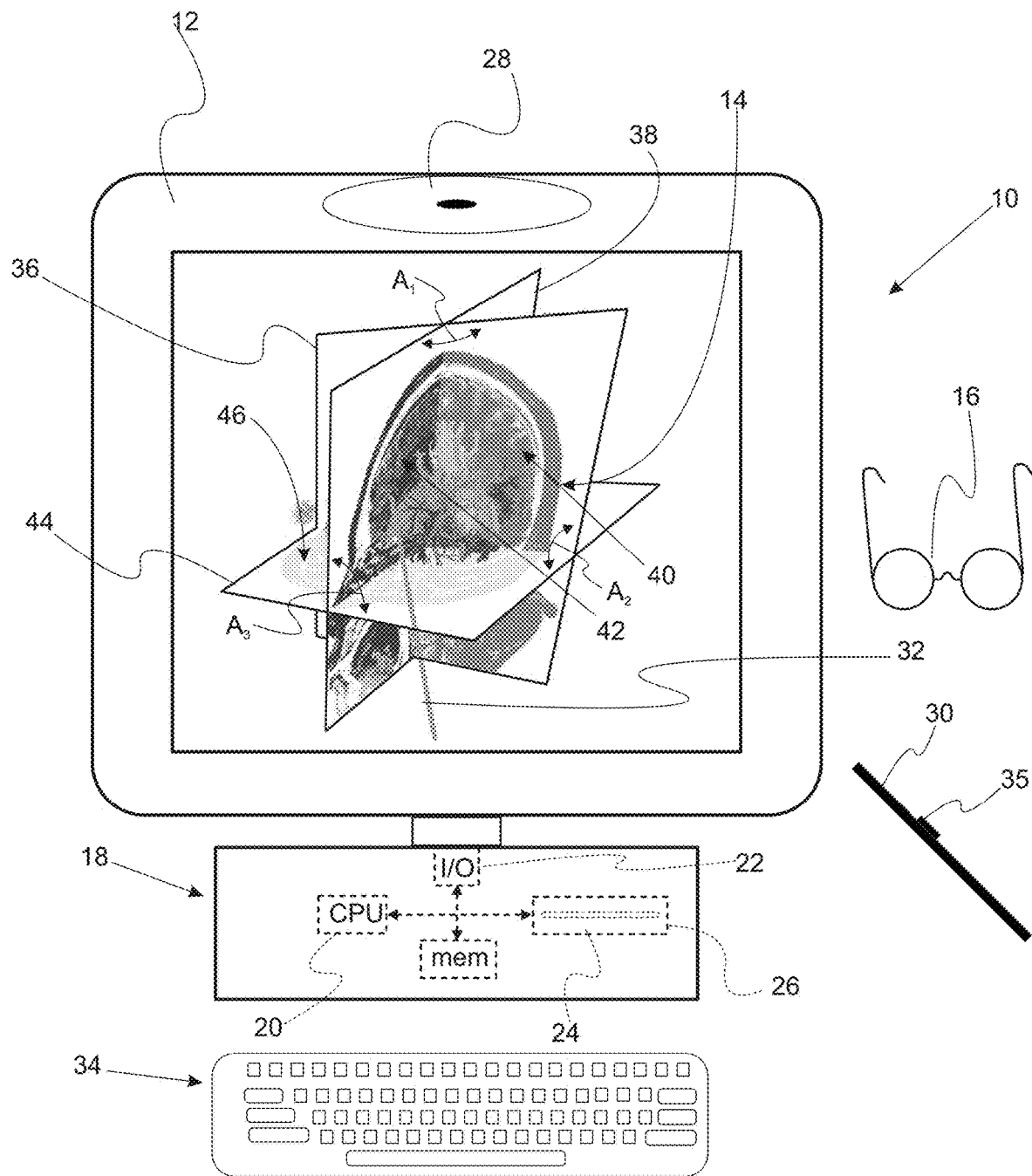
FIG. 1 is a schematic of a computer system that implements a method for providing adjustable three-dimensional (3D) rendering of locations in a subject.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "server" refers to any computer, computing device, mobile phone, desktop computer, notebook computer or laptop computer, distributed system, blade, gateway, switch, processing device, or combination thereof adapted to perform the methods and functions set forth herein.

When a computing device is described as performing an action or method step, it is understood that the computing devices is operable to perform the action or method step typically by executing one or more line of source code. The actions or method steps can be encoded onto non-transitory memory (e.g., hard drives, optical drive, flash drives, and the like).

Actions described as being performed by a user in relation to the computer-implemented method means that the computer-implemented method is configured to receive inputs from the user for these actions.

The term "computing device" refers generally to any device that can perform at least one function, including communicating with another computing device.

Throughout this application, where publications are referenced, the disclosures of these publications in their entireties are hereby incorporated by reference into this application to more fully describe the state of the art to which this invention pertains.

The term "stereoscopic image" refers to an image having at least two views, one corresponding to a left-eye view and one corresponding to a right-eye view. When these images are viewed with the appropriate equipment, a three dimensional rendering is realized in the user's brain.

It should be appreciated that any manipulation of a stereoscopic image can be applied to each image of a set or plurality of stereoscopic images.

The processes, methods, or algorithms disclosed herein can be deliverable to/implemented by a computing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

Abbreviations

"AR" means augmented reality.
"DTI" means diffusion tensor imaging.
"CPU" means central processing unit.
"CT" means computed tomography.
"CTA" means computed tomography angiogram.
"fMRI" means functional magnetic resonance imaging.
"MRA" means magnetic resonance angiography.
"MRI" means magnet resonance imaging.
"PET" means positron-emission tomography.
"PWI" means perfusion-weighted imaging.
"SWI" means susceptibility weighted imaging.
"VR" means virtual reality.

Figure 2:
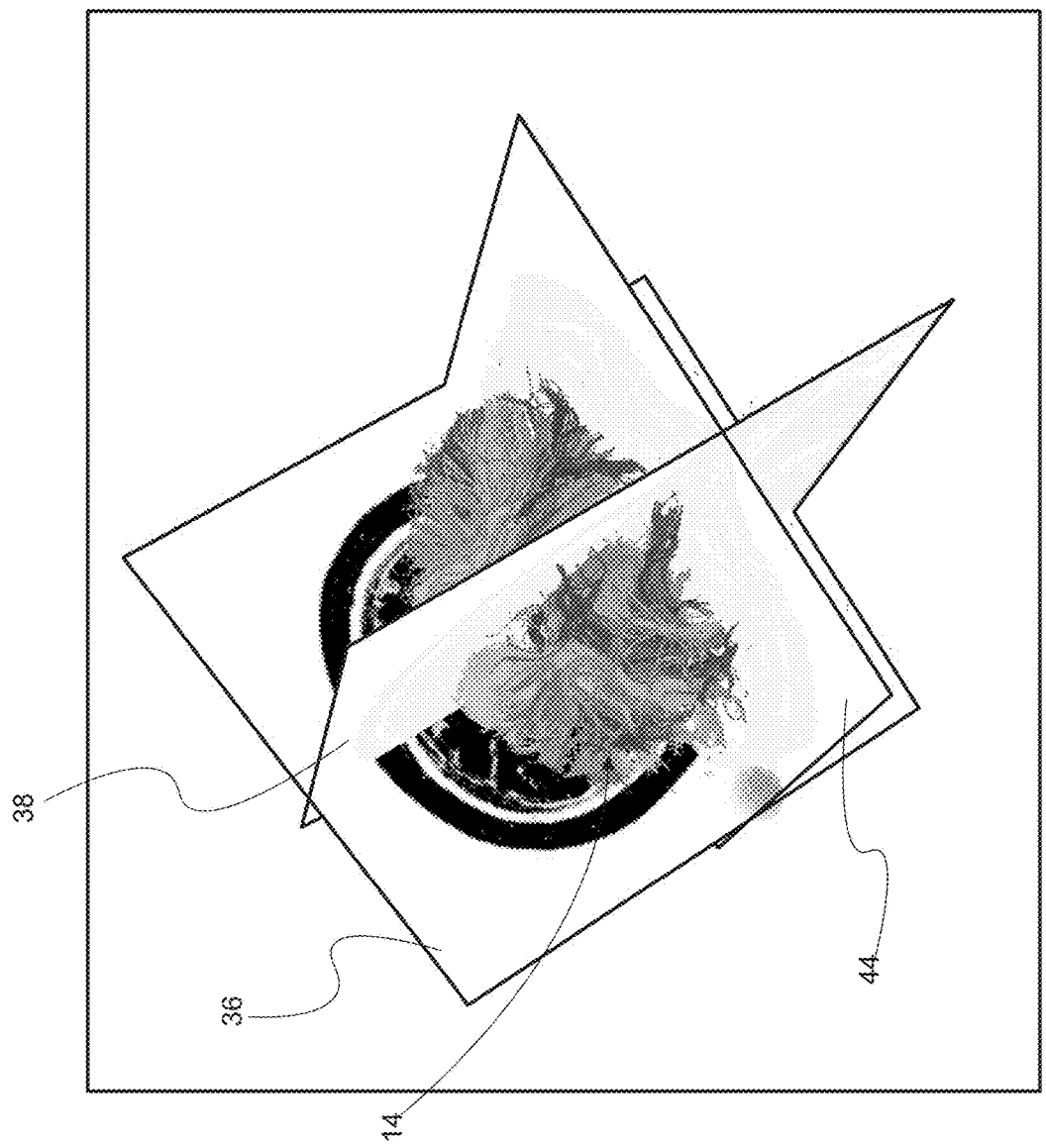
FIG. 2 provides a rendering of a stereoscopic image that is rotated with respect to the stereoscopic image of FIG. 1.

With reference to FIGS. 1 and 2, a computer imaging system and a method for providing adjustable three-dimensional (3D) rendering of locations in a subject implemented by the computer imaging system are schematically illustrated. FIG. 1 provides a schematic illustration of an imaging system that can implement the computer-implemented method. Computer imaging system 10 includes display 12 for displaying a rendered stereoscopic image 14 of a portion of a subject (e.g., a patient) that can be viewed with stereoscopic viewing glasses 16. Alternatively, an AR or VR headset can be sued to view the stereoscopic images. It should be appreciated that although images herein are displayed in black and white, actual stereoscopic images can be rendered in color. In a refinement, the stereoscopic image renders white matter fiber tracts, blood vessels, bones, anatomical structures, surgical tools or surgical accessories. The white matter fibers could be encoded in any colors as the users wish according to their fiber orientations, locations, or sequential numbering. A typically color encoding for white matter tracts and fibers is green for tracts and fibers predominately aligned along an anterior/posterior direction, red for tracts and fibers predominately aligned along a left/right direction, and blue for tracts and fibers predominately aligned along a superior/inferior direction.

Computer imaging system 10 also includes computer processor component 18 that includes a CPU 20, input/output interface 22, memory 24, and a storage device 26. The computer processor component 18 is operable to execute steps of the computer-implemented method. In a refinement, computer system 10 also includes tracking system 28 optionally mounted to display 12 that can monitor the location and orientation of stereoscopic viewing glasses 16, pointing device 30, and optionally hand gestures from a user. Motions and actions of pointing device 30 are reflected on display 12 as pointer cursor 32. Keyboard 34 can be used to input commands and other information into the computer imaging system. The computer-implemented method includes a step of receiving image data having a discrete spatial resolution for white matter tracts and/or fibers in a subject (e.g., a patient). Typically, the image data is generated by diffusion imaging, and in particular, by magnetic resonance diffusion imaging. With such imaging, first stereoscopic image 14 provided whiter matter fiber tracking of brain and spinal cord tissue. A first stereoscopic image 14 is rendered on a display 12 from the image data. The first stereoscopic image includes image parallax in order to provide the 3D rendering. Therefore, the first stereoscopic image is viewable with stereoscopic or polarized glasses 16 that optionally have fiducials allowing position and orientation tracking of the stereoscopic glasses. While the glasses move, the stereoscopic image will update dynamically to display a different perspective of the rendered view to realize a 3D view effect. Alternatively, the stereoscopic images can be viewed by a head-mounted AR or VR display with eye-tracking or head motion tracking. While the user's vision focus moves or head moves, the stereoscopic images will be updated dynamically to reflect the corresponding perspective of the rendered view to realize a 3D view effect. An input from pointing device 30 that allows manipulation of the first stereoscopic image while maintaining proper three-dimensional spatial relationships is received. Characteristically, pointing device 30 interacts with the first stereoscopic image in three-dimensional space with six degrees of freedom (e.g., three translational degrees of freedom plus the three Euler angles). The ability of pointing device 30 to interact with six degrees of freedom allows a user to reach behind the stereoscopic image 14 and perform manipulations as set below in more detail. In this regard, pointing device 30 or a hand gesture assists in rotation, zooming, translation, editing, highlighting, addition (e.g., adding to), segmenting and/or deleting for the first stereoscopic image. Typically, pointing device 30 includes one or more buttons 35 that are used to actuate commands. FIG. 2 provides a rendering of stereoscopic image 14 that is rotated via the application of pointing device 30

In a variation, a first reference plane 36 and a second reference plane 38 are also rendered on display 14. The first reference plane 36 and a second reference plane 38 each independently intersect the first stereoscopic image 14 such that first reference plane 36 has first reference image 40 rendered thereon and second reference plane 38 has second reference image 42 rendered thereon. Therefore, the combination of first reference plane 36 and second reference plane 38 with the first stereoscopic image 14 is a second stereoscopic image. First reference plane 36 is oriented at a first angle $A_1$ with respect to second reference plane 38 that is typically from 30 to 150 degrees. Input from the pointing device 30 can be received that selects positions or rotates at any angle of the first reference plane or the second reference plane wherein the first two-dimensional image and the second two-dimensional image update when their position or orientation changes (e.g. rotation at any angle).

Figure 3A:
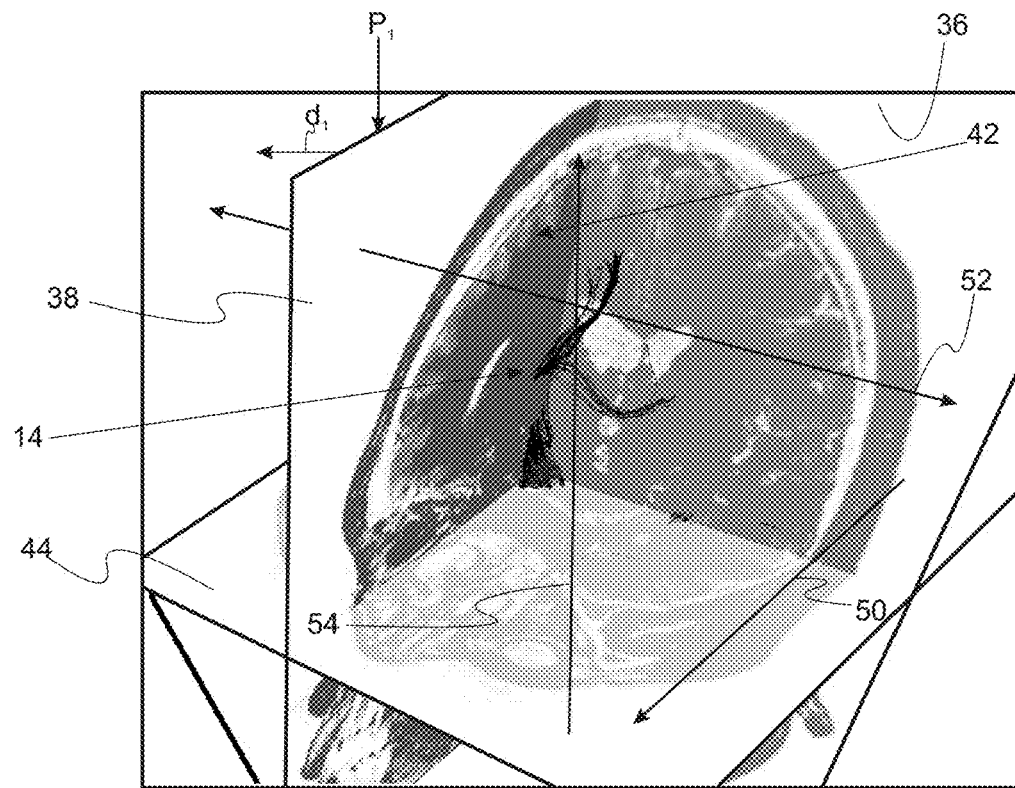
FIGS. 3A, 3B, and 3C depict a rendering of a user translating a reference plane.
Figure 3B:
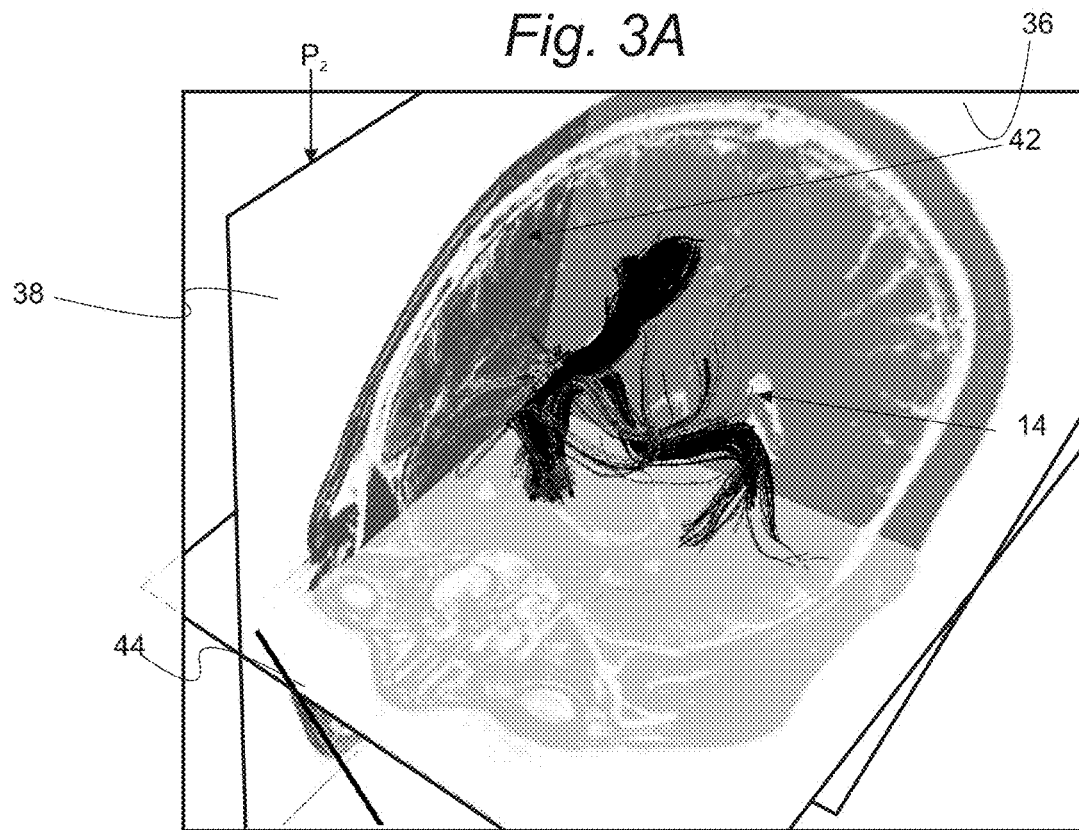
Figure 3C:

Referring to FIGS. 1, 2, 3A, and 3B, a third reference plane 44 intersecting first stereoscopic image 14 can also be displayed intersecting first stereoscopic image 14. Characteristically, third reference plane 44 has rendered thereon third reference image 46 of a subject's anatomy intersecting the third reference plane. The third reference plane is oriented at second angle $A_2$ with respect to first reference plane 36 and at a third angle $A_3$ with respect to second reference plane 38. In a refinement, the second angle $A_2$ and third angle $A_3$ are each from about 30 to 150 degrees. Input from the pointing device 30 can be received that selects positions or rotations at any angle of the first reference plane 36 or second reference plane 38 or third reference plane 44. When a reference plane moves or rotates in this manner the reference image updates (i.e., when the position or orientation changes). In particular, an input is received from the pointing device or hand gesture that selects positions or orientations of the third reference plane or the second reference plane wherein the third reference image updates when their position or orientation changes. Advantageously, a user (via the pointing device) can translate or rotate first reference plane 36 along a first axis 50 or second reference plane 38 along a second axis 52 or third reference plane 44 along a third axis with the two-dimensional reference image associated with the translating reference plane updating during the translation. FIGS. 3A and 3B show a rendering after a user has translated second reference plane 38 along axis 52. It should be observed that the second reference image has changed when reference plane 38 moves from position $P_1$ to position $P_2$. It should also be understood that the reference images continuously and dynamically update as a reference plane is moved. FIG. 3C provides a stereoscopic image of the fibers bundle selection that is highlighted in FIGS. 3A and 3B. Details about making such selections are set forth below.

As set forth above, first reference plane 36 has rendered thereon first reference image 40, second reference plane 38 has rendered thereon second reference image 42 and third reference plane 44 has rendered thereon third reference image 46. In general, the reference images are each independently a two-dimensional image or a three-dimensional image of a subject's organ, anatomy or pathology (e.g., tumor, aneurysm, etc.) thereof. In a refinement, each of these reference images displays corresponds to the slice of first stereoscopic image 14 that is formed by tdigital subtraction angiography, white matter tracking data, ultrasound, mammography, PET, photoacoustic images or any data that further derived from these datasets. In a further refinement, the user can initiate a procedure that displays reference images from previously generated image data that are displayed along with the first stereoscopic image. Examples of previously generated image data also include, but are not limited to, CT data, MRI data, digital subtraction angiography, white matter tracking data, ultrasound, mammography, PET, photoacoustic images or any data that further derived from these datasets.

Figure 4A:
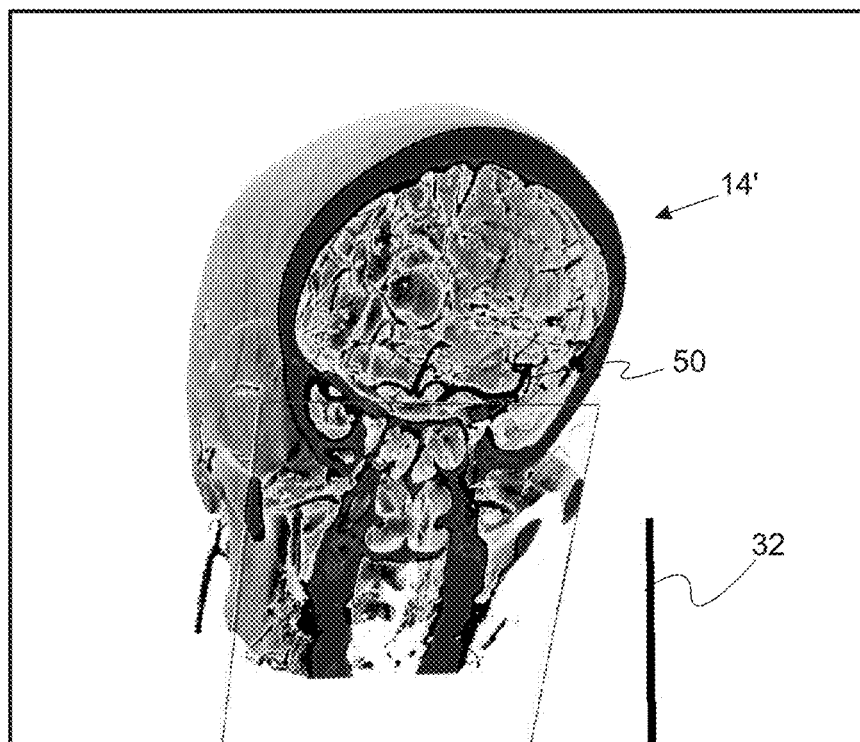
FIGS. 4A and 4B illustrate the selection of a subcomponent of the first stereoscopic image that could be highlighted, segmented out to form a stereoscopic sub-image that is independently editable at a voxel level.
Figure 4B:
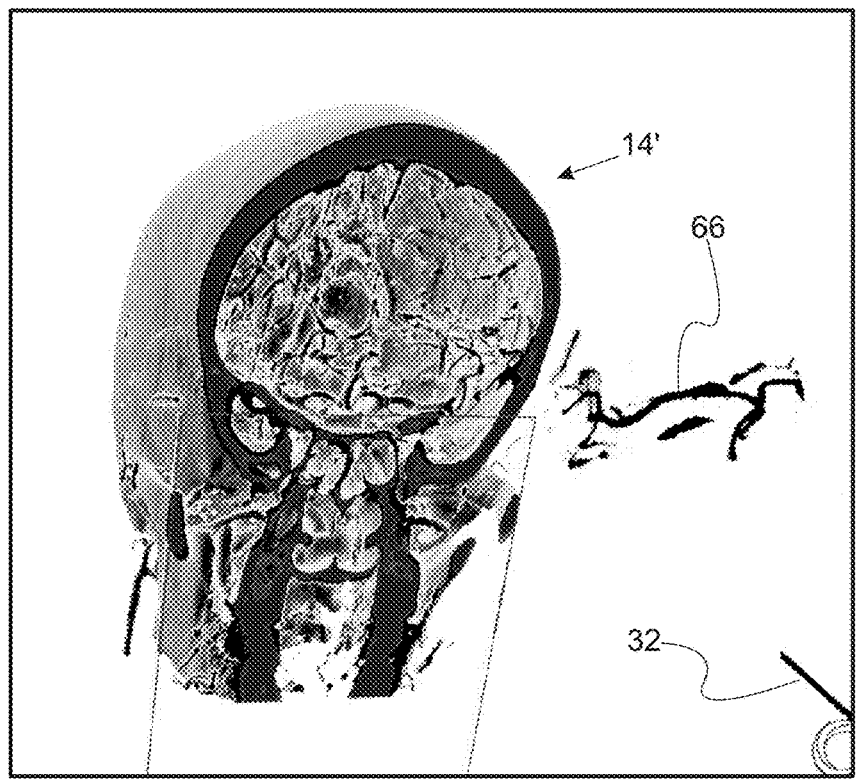

FIGS. 4A and 4B illustrate the highlighting and selection of a subcomponent of the first stereoscopic image that is segmented out to form a stereoscopic sub-image that is independently editable, manipulative, or measurable at a voxel level. Stereoscopic image 14' includes a sub-component 66 that can be selected by pointing device 32 (which reflects the pointing device's movement). Sub-component 50 can then be rendered such that it is isolated from the rest of stereoscopic image 14'. This isolated sub-component 50 is now editable at the voxel level.

Figure 5A:
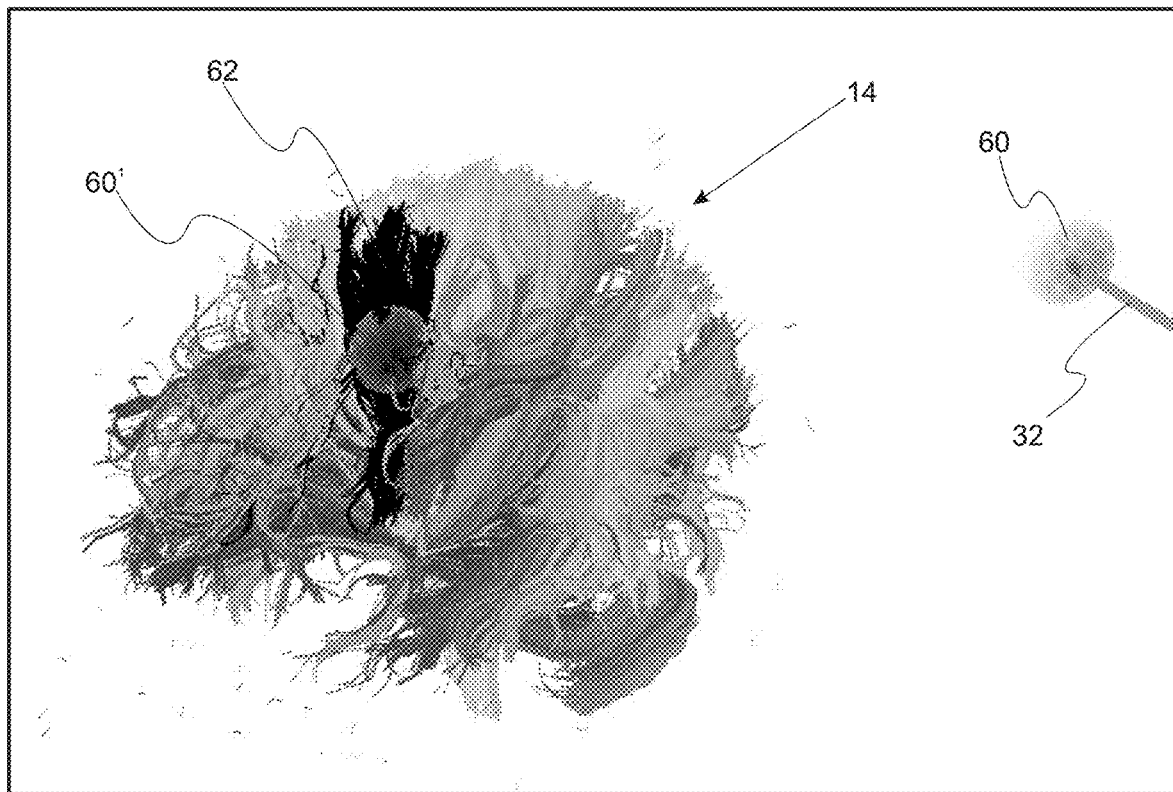
FIGS. 5A and 5B depict the use of tracking containers for performing operations on rendered stereoscopic images.
Figure 5B:
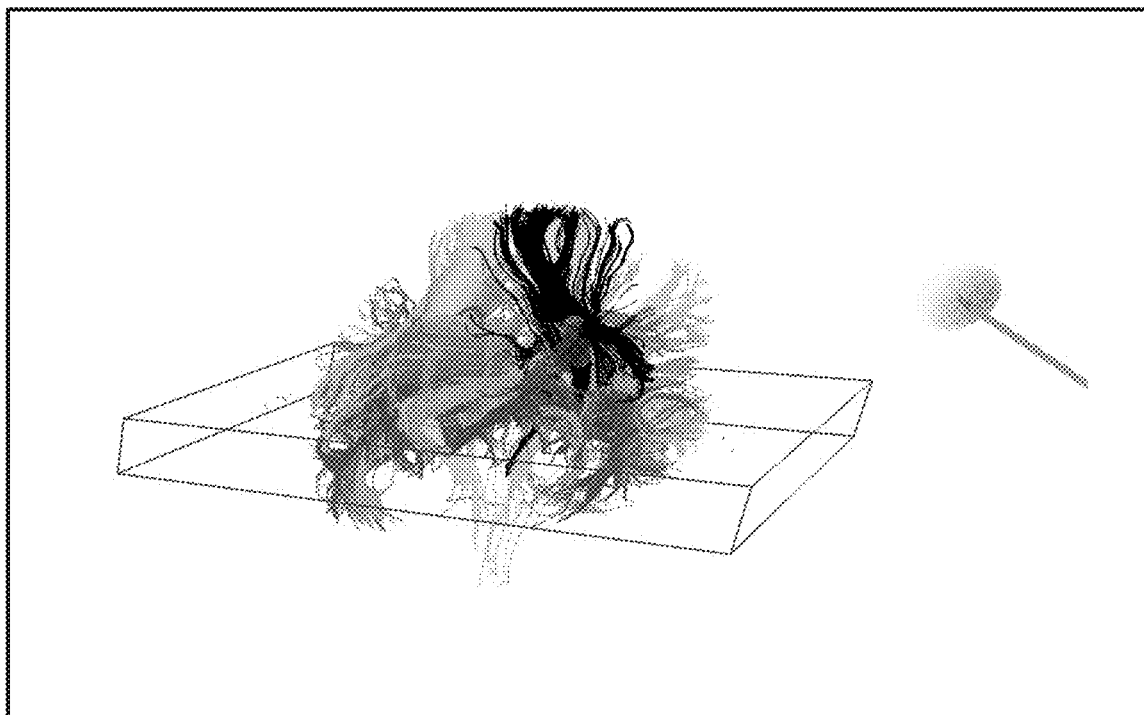

With reference to FIGS. 5A and 5B, screenshots showing the use of tracking containers for performing operations on rendered stereoscopic images is provided. A user initiates with pointing device 30 or hand gesture the rendering of a three-dimensional tracking container 60 on the first stereoscopic image 14. FIG. 5A shows that an editing mode has been entered since cursor 32 has container 60 rendered at its tip. FIG. 5A further shows that a container 60' has already been placed on stereoscopic image 14 in this manner. White matter tracts and/or fibers 62 passing through three-dimensional tracking container 60' are highlighted. In a refinement, white matter tracts and/or fibers not passing through three-dimensional tracking container 60 are removed or hidden from the first stereoscopic image 14. The present variation is not limited by the shape of the three-dimensional tracking container 50. Suitable shapes include, but are not limited to, a sphere, disk, cylinder, ellipsoid, cube, cuboid, parallelepiped, a slice of the image, a slab of 3D anatomical organ, a manually drawn shape or surgical corridor, or any shape that is imported from other sources. In a further refinement, three-dimensional tracking container 60 moves in response to user input (e.g., from pointing device 30) such that highlighted fibers that pass through the container are updated dynamically as the three-dimensional tracking container moves.

In a refinement, the method further includes freezing results of application of one or multiple three-dimensional tracking containers. In a refinement, the results could be reloaded later or exported for other equipment use such as a surgical navigation system.

FIG. 5B illustrates the application of a container that is in the form of a rectangular box. In this example, the application of container 60 selectively highlights fibers 62 that pass this rectangular box. When the thickness of the rectangular box is reduced to a thin slice or a plane, only those fibers with their main orientation crossing the slice will be displayed. This rectangular box could also be a slab or a slice of an anatomical structure. By adjusting the orientation of the slice or plane, the user could select different fiber orientations.

Figure 6A:
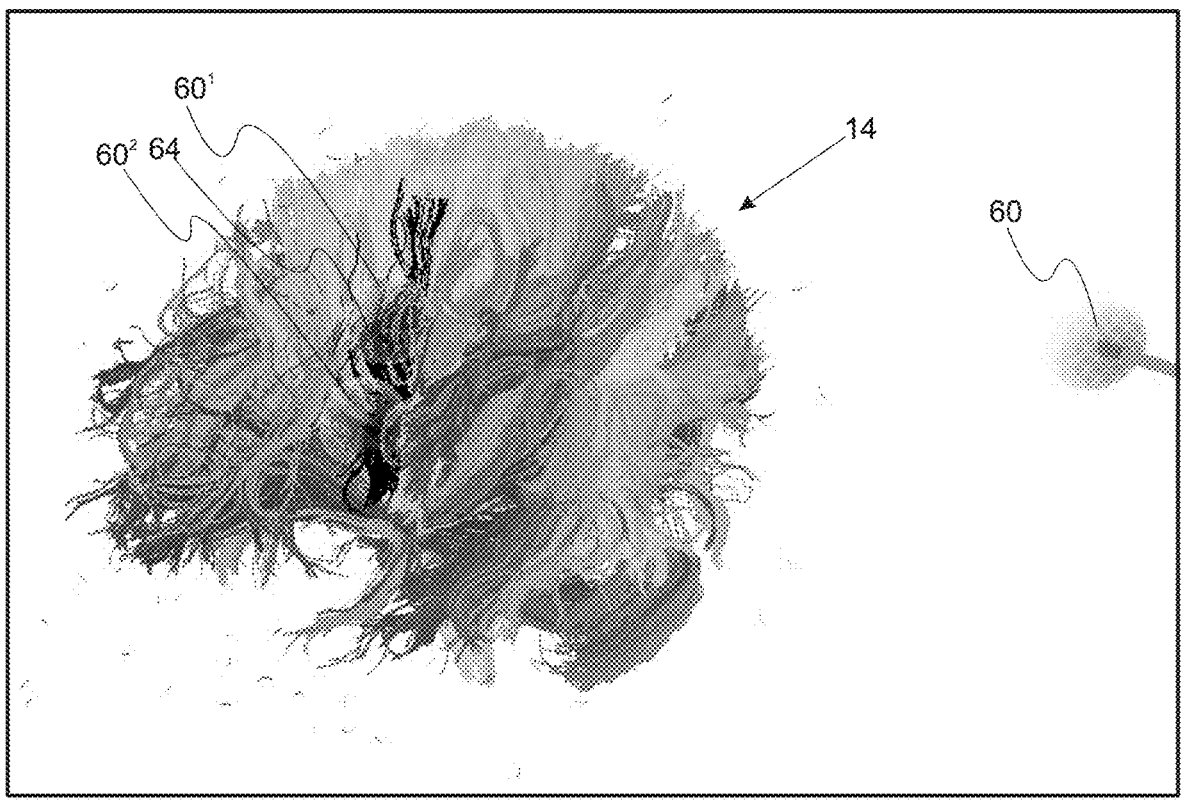
FIGS. 6A and 6B show the results of an "AND" operation when two containers $60^1$, $60^2$ are placed on an image.
Figure 6B:
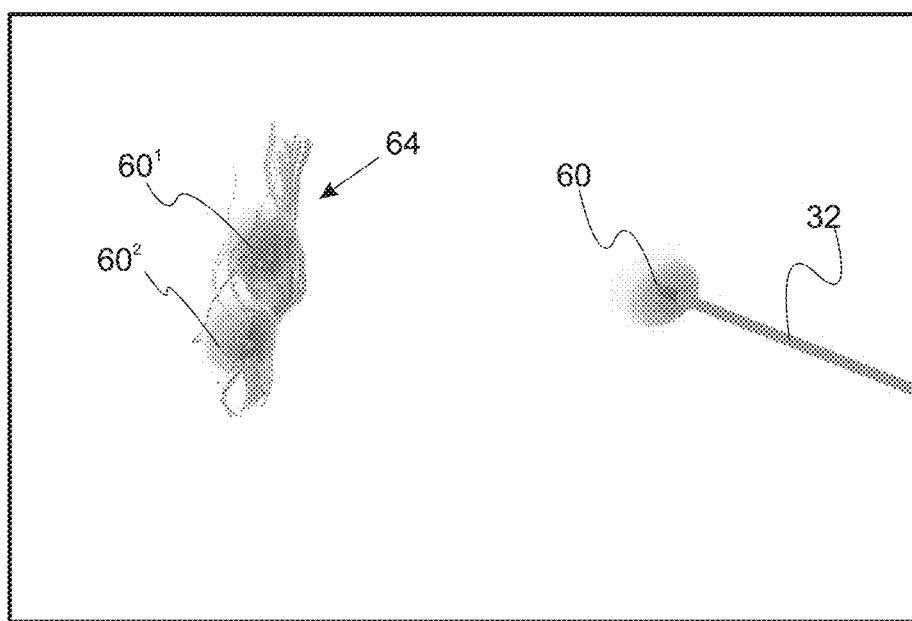
Figure 7A:
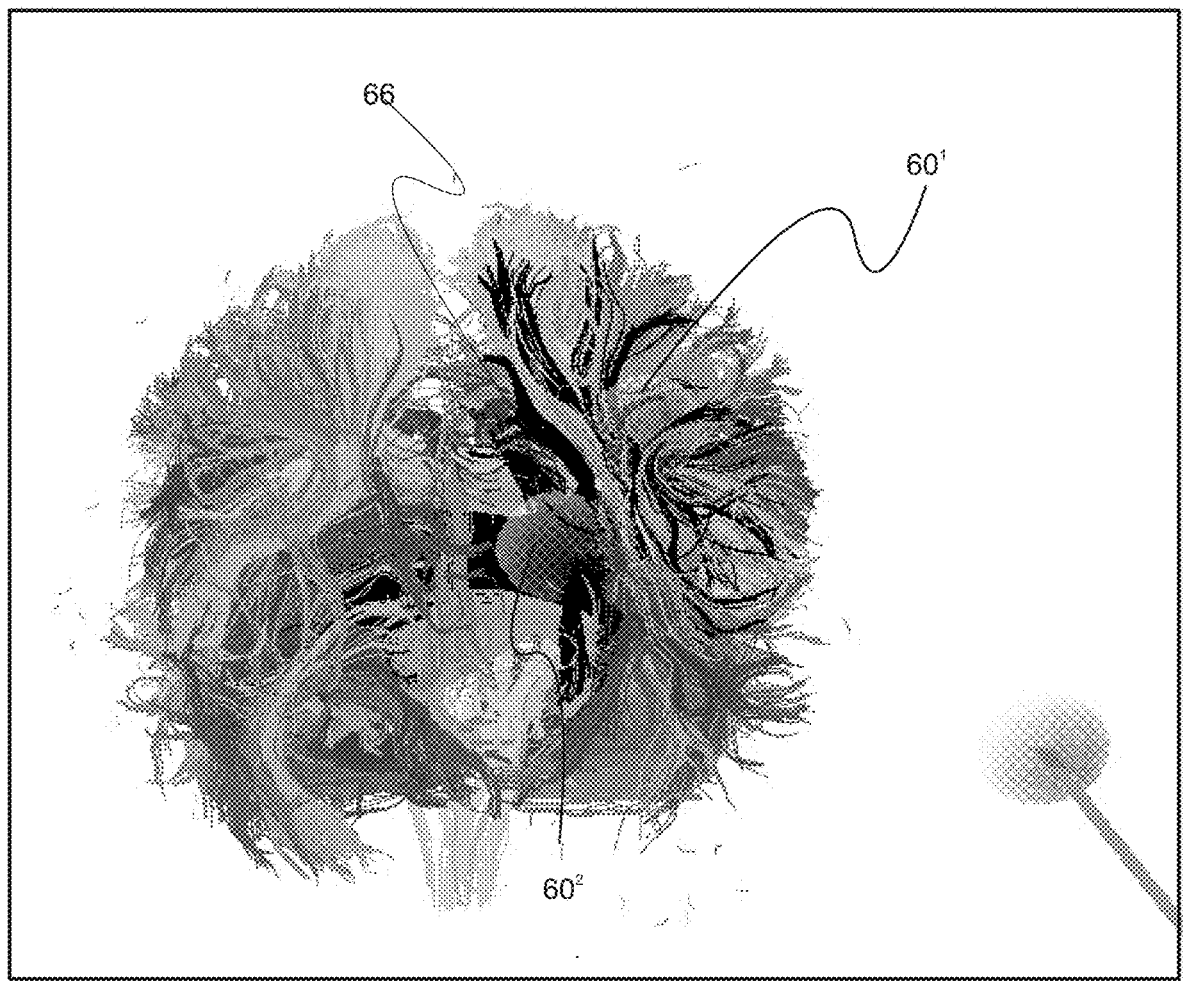
FIGS. 7A and 7B illustrate the combined actions of two containers to define an "OR" operation as depicted.
Figure 7B:
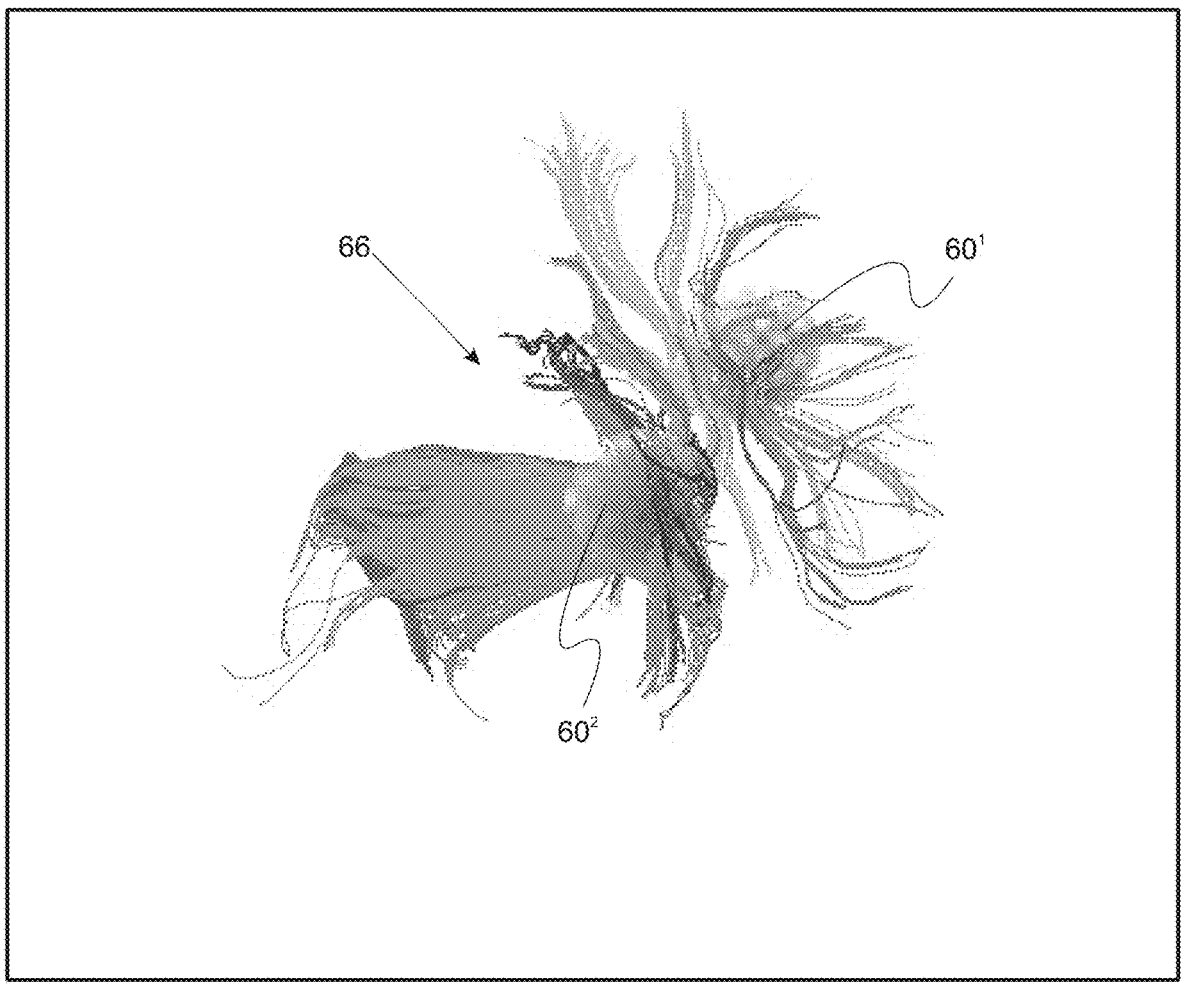
Figure 7C:
FIG. 7C illustrates a "NOT" operation.

A plurality of three-dimensional tracking containers can be rendered on the first stereoscopic image 14 to perform complex manipulations of the rendered stereoscopic images. In a refinement, fibers are displayed or highlighted in accordance with any combination of Boolean operations associated with each three-dimensional tracking container of the plurality of three-dimensional tracking containers. FIGS. 6A and 6B showed the results of an "AND" operation when two containers $60^1$, $60^2$ are placed on an image. Since each container only highlights fibers passing through it, the result for an "AND" operation is that only fibers 64, which pass through both containers are highlighted. FIGS. 7A and 7B illustrate the combined actions of two containers to define an "OR" operation as depicted. In this instance, fibers 66 that pass through either of container $60^1$ or $60^2$ are highlighted. In a refinement, the first stereoscopic image where fibers are displayed or highlighted in accordance with any combinations of Boolean operations associated with each three-dimensional tracking container of the plurality of three-dimensional tracking containers. It should be appreciated that complex Boolean operations on stereoscopic image 14 can be realized by applying combinations of the "AND" and "OR" operations. FIG. 7C shows the results of the "Not" operation. In this variation, fibers 66 that pass through container 60 are not displayed or deleted.

Figure 8A:
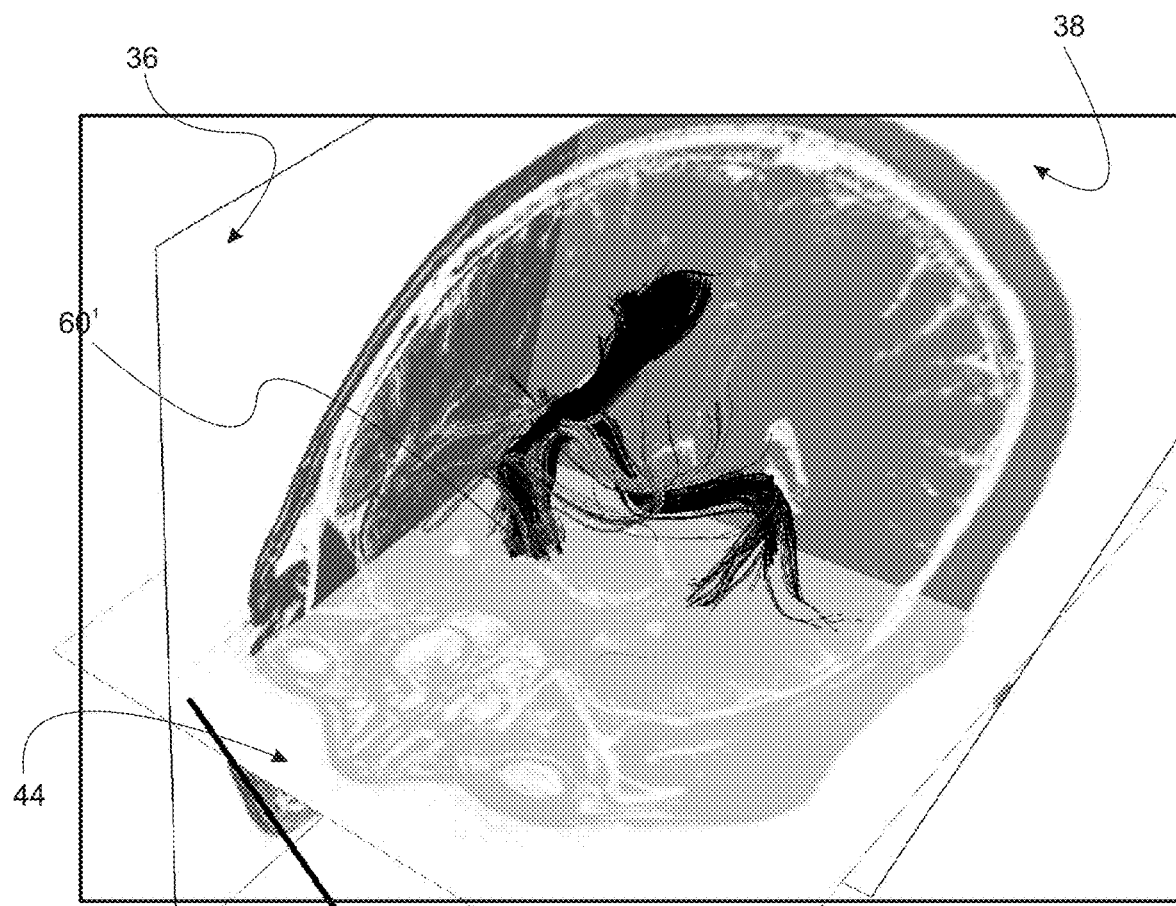
FIG. 8A depicts a scenario in which a container is fixed to a third reference plane.
Figure 8B:
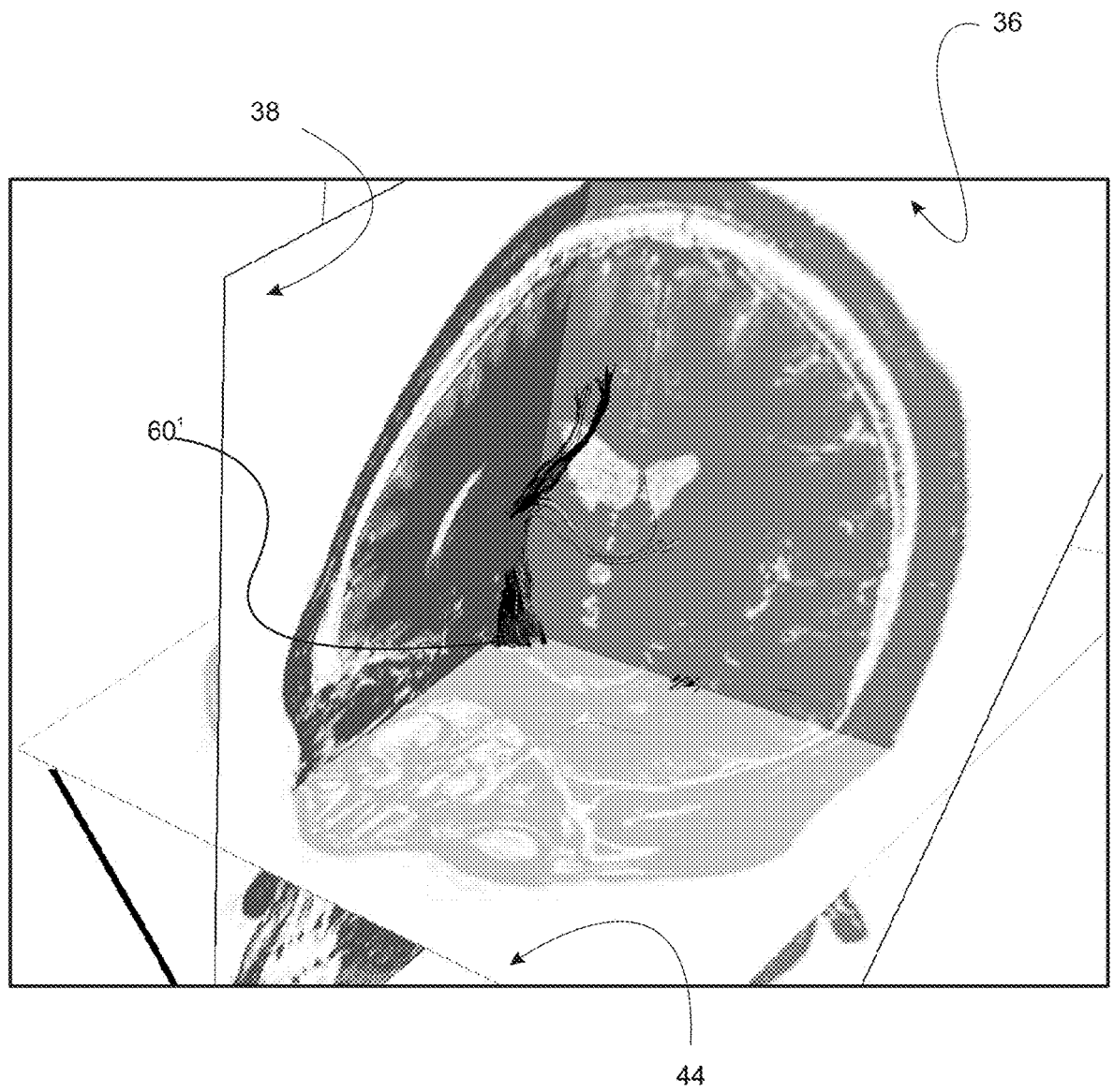
FIG. 8B depicts a scenario in which a container is fixed at the intersection of three reference planes.

In a refinement, three-dimensional tracking container 60 is fixed to the first reference plane 36 and/or the second reference plane 38 (or any combination of one, two or three reference planes) such that three-dimensional tracking container 60 is movable in unison with user-directed movement (e.g., via pointing device 30 or a hand gesture) the first reference plane 38 and/or the second reference plane 38 and/or third reference plane 44. FIG. 8A provides an example where container $60^1$ is fixed to third reference plane 44. Moreover, the three-dimensional tracking container 60 can be fixed at a crossing point for the first reference plane 36, the second reference plane 38, and the third reference plane 44 such that three-dimensional tracking container 60 is movable in unison with user directed movement (e.g., via pointing device 30 or a hand gesture) of any of the first reference plane 36, the second reference plane 38, and the third reference plane 44. FIG. 8B shows container $60^1$ fixed at the intersection of first reference plane 36, second reference plane 38, and third reference plane 44. Similarly, in each of these scenarios, reference planes will move in unison with user-directed movement of three-dimensional tracking container 60.

In a further refinement, the results of the operation of one or multiple three-dimensional fiber tracts can be frozen (i.e., locked while other editing functions are being performed). The frozen fibers could also be de-frozen so that the user could further edit the fibers. The frozen fiber set could be saved into files and export. And the previously saved or imported frozen fibers could also be loaded into the computer.

Figure 9:
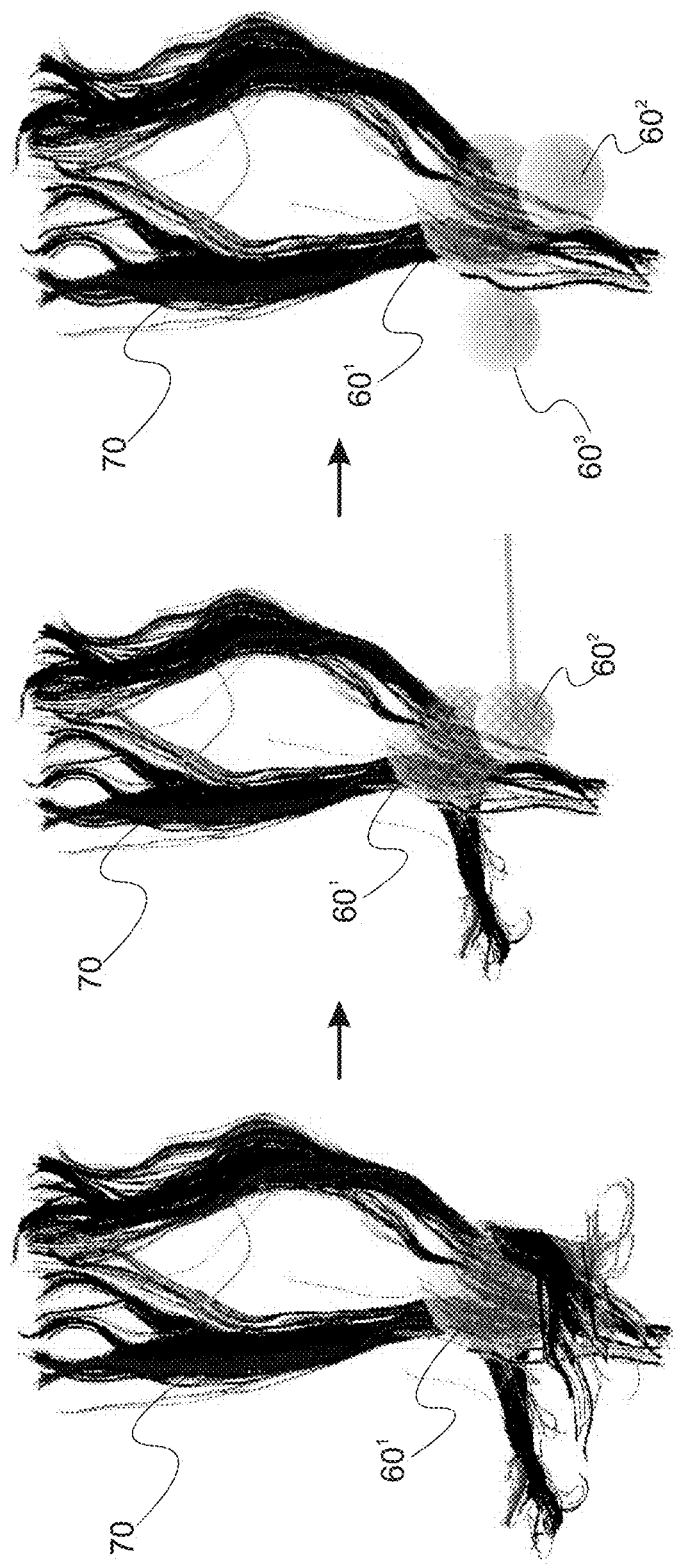
FIG. 9 is a schematic illustration depicting a scenario in which the additional containers delete portions of fibers 70.

In another refinement as depicted in FIG. 9, once a container 60' is applied to generate a subset of fibers 70 other containers $60^2$ and $60^3$ can also be further applied to the generated subset to manipulate fibers at finer level. FIG. 9 depicts a scenario in which the additional containers delete portions of fibers 70. In another refinement, the user can selectively to show or hide fibers that mainly run in certain directions, for example, anterior-posterior direction, left-right direction, superior-inferior direction to generate a subset of the fibers. In a further refinment, the user can selectively choose to display or hide specific set of white matter tracts in an automated way or with manual assistance.

It should be appreciated that the fiber tracking scenes described herein, including all fibers and their orientation, can be saved into files and exported. The previously saved or imported fiber tracking scene could also be loaded into the computer to reproduce the exact same scene as before.

In another refinement, during tracking of a certain fiber pathway of a subject's brain or spinal cord, the system could provide a reference fiber pathway for the user to recognize the shape, orientation and location of the fiber. In a useful application, the fiber tracking environment could also be co-registered with the subject's CT, MRI, DSA, PET, ultrasound, mammography, or photoacoustic data to form a composite organ image. The user can plan a surgical path or surgical corridor in the composite 3D organ. During the moving or adjusting of a surgical path or surgical corridor, all fibers that pass through the surgical path can be dynamically highlighted. The computer-implemented method for providing adjustable three-dimensional (3D) rendering of locations in a subject set forth above can advantageously be integrated into a surgical navigation system such as the system described below in more detail.

Figure 10:
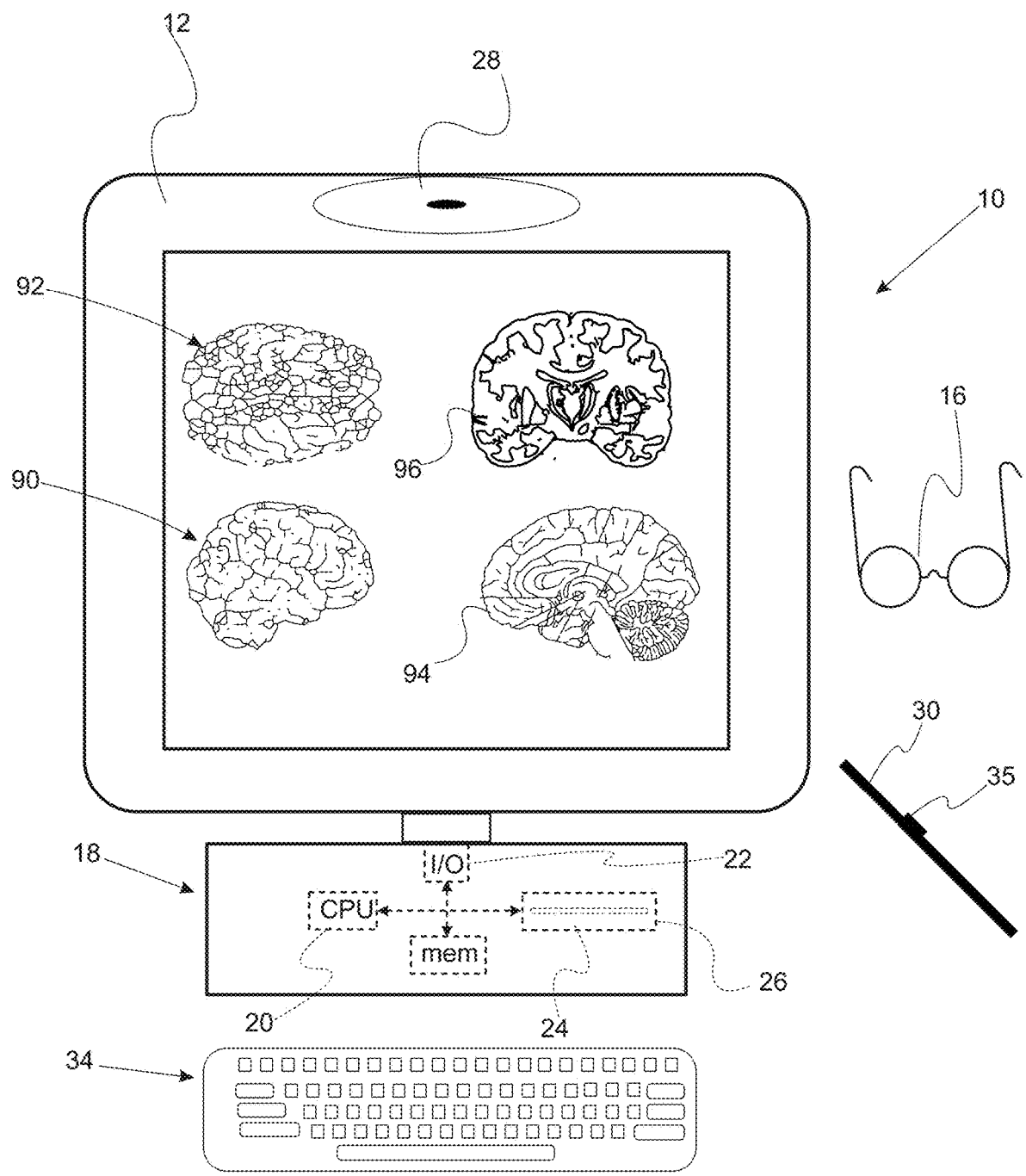
FIG. 10 provides a schematic illustration of an imaging system that implements a method for providing a simultaneous adjustable two-dimensional view and three-dimensional stereoscopic rendering of locations in a subject.

In another embodiment, a computer imaging system and a method for providing simultaneous adjustable two-dimensional and three-dimensional (3D) rendering of locations in a subject implemented by the computer imaging system are provided. FIG. 10 provides a schematic illustration of an imaging system that can implement the computer-implemented method. Computer system 10 includes display 12 or head-mounted display(s) for displaying a rendered stereoscopic image 14 of a portion of a subject that can be view with stereoscopic or polarized viewing glasses 16. It should be appreciated that although images herein are displayed in black and white, actual stereoscopic images can be rendered in color as set forth above. Computer system 10 also includes computer processor component 18 that includes a CPU 20, input/output interface 22, memory 24, and a storage device 26. In a refinement, computer system 10 also includes tracking system 28 optionally mounted to display 12 that can monitor the location and orientation of stereoscopic viewing glasses 16, pointing device 30, and optionally hand gestures from a user. Motions and actions of pointing device 30 are reflected on display 12 as pointer cursor 32. Keyboard 34 can be used to input commands and other information into computer system. The method implemented by computer system 10 includes a step of receiving image data having a discrete spatial resolution for locations in a subject (e.g., white matter tracts). At least one stereoscopic image 90 is rendered on display 12 from the image data. FIG. 10 shows two stereoscopic images 90, 92 being rendered. The stereoscopic images include image parallax in order to provide the 3D rendering. Therefore, the stereoscopic images are viewable with stereoscopic glasses 16 or a stereoscopic display that have fiducials allowing position and orientation tracking of the stereoscopic glasses. In a refinement, the stereoscopic image can be displayed on a polarized stereoscopic screen or head-mounted displays. Alternatively, head-mounted VR or AR displays can be used. The head-mounted displays have cameras to track the focus of vision or head position or orientation or location of an interacting pointer or hand gesture. One or more two-dimensional images 94, 96 corresponding to predetermined slices in the first stereoscopic image are also rendered on display(s) 12 (e.g., a polarized stereoscopic screen or head-mounted displays.) An input from a pointing device or a hand gesture that allows manipulation of the stereoscopic images and the two-dimensional images while maintaining proper three-dimensional spatial relationships is received.

Still referring to FIG. 10, pointing device 30 or the hand gestures interacts with the first stereoscopic image in three-dimensional space with six degrees of freedom (e.g. three translational degrees of freedom plus the three Euler angles). Pointing device 30 or the hand gestures assists in rotation, zooming, translation, editing, highlighting, registration, addition, segmenting and/or deleting of the stereoscopic images (i.e., in 3D space) and/or the two-dimensional images. When the stereoscopic image (i.e., in 3D space) changes, the corresponding slice of 2D will also update dynamically and reflect the changes. Vice versa, when one or more than one 2D slice change, the corresponding 3D image will also be updated dynamically and reflect the changes. For example, the pointing device can be used to highlight an image segment that interacts with a simulated, virtual surgical path in 3D space. A user can also select different anatomical components that are made individually transparent or translucent, or which are individually cut or drilled into shapes to simulate the surgical procedure. Advantageously, a microscopic view, along with a pathway of cutting or drilling of the anatomy, can be simulated. Typically, pointing device 30 includes one or more buttons 35 that are used to actuate commands. In a refinement, pointing device 30 has fiducials allowing position and orientation tracking of the pointing device.

In a variation, pointing device 30 or hand gesture is used to make edits or manipulation to the stereoscopic image and/or the two-dimensional images. For example, the user can highlight and/or select a subcomponent of the stereoscopic image that is segmented out to form a stereoscopic sub-image that is independently editable at a voxel level. In a refinement, the user initiates with the pointing device or hand gesture a rendering of a three-dimensional container on the first stereoscopic image such that editing functions including highlighting, segmenting, and deleting can be applied to portions of stereoscopic images inside the container or portions of stereoscopic images outside the container, at a voxel level. Advantageously, the user selects, manipulates, and align two stereoscopic images together to help them co-register together to form a revised stereoscopic image.

In a refinement, image data is collected by functional magnetic resonance imaging, T1 or T2 weighted magnetic resonance imaging, computed tomography, diffusion tensor imaging, computed tomography angiogram, magnetic resonance angiography, perfusion-weighted imaging, susceptibility-weighted imaging, digital subtraction angiography, ultrasound, mammography, photoacoustic images, positron-emission tomography, and combinations thereof. In another refinement, the first stereoscopic image is a composite image rendered from image data collected by at least one of (or two or more) of imaging techniques including functional magnetic resonance imaging, T1 or T2 weighted magnetic resonance imaging, computerized tomography, diffusion tensor imaging, computed tomography angiogram, magnetic resonance angiography, perfusion-weighted imaging, susceptibility-weighted imaging, ultrasound, mammography, photoacoustic images, and positron-emission tomography.

In a variation, composite images can be constructed as set forth above. The composite images include renderings of different segments of an organ that are co-registered. Image data from the different imaging methods are co-registered and/or segmented to form a composite image such that different anatomical structures are from different imaging methods. The contribution of each imaging method could be adjusted to form a composite image. In a refinement, the user selectively adjusts the opacity or cut any specific parts or layers of the composite stereoscopic image to form a revised stereoscopic image. The method for providing simultaneous adjustable two-dimensional and three-dimensional (3D) rendering of locations in a subject set forth above can advantageously be integrated into a surgical navigation system such as the system described below in more detail. In this regard, the user can selectively adjust the opacity or cut any specific parts or layers of the composite stereoscopic image to form a revised stereoscopic image. In a refinement, the user applies slicing plane(s), a simulated surgical drill, a surgical scalpel, or any simulated surgical tools, individually or in any combination, to cut any specific part, but not other part, of the composite stereoscopic image into any shape. In particular, a microscopic view, along with the pathway of cut or drill of the anatomy can be simulated.

In a variation, a planned surgical path or surgical corridor, along with images and important structures, including white matter fiber tracts, blood vessels and others, are exported as independent set of images for use by other equipment, including surgical navigation system, for surgical consideration.

Figure 11:
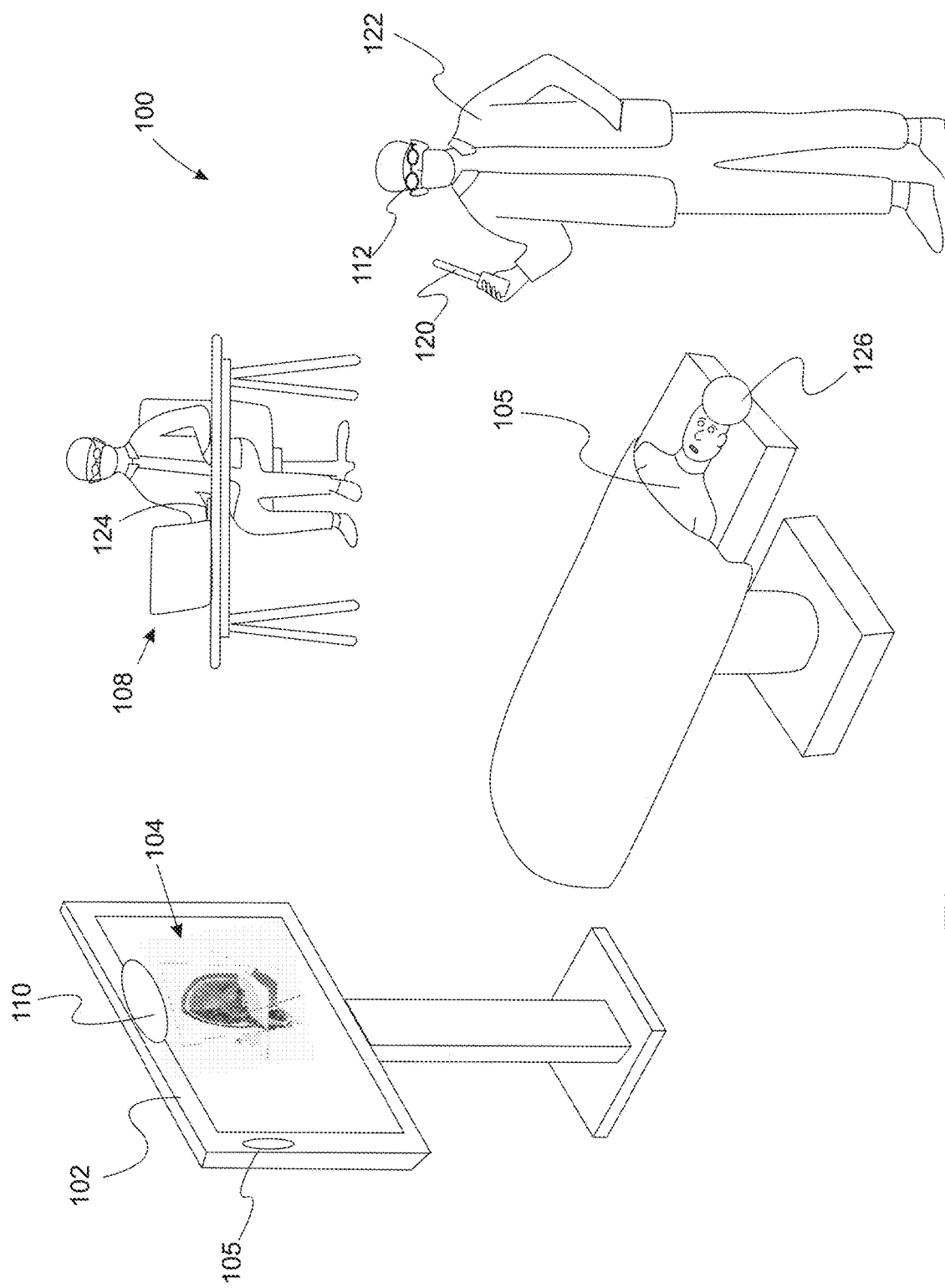
FIG. 11 provides a schematic illustration of a surgical navigation system.

In still another embodiment, a surgical navigation system and a method for providing adjustable three-dimensional (3D) rendering for surgical assistance implemented by the surgical navigation system are provided. FIG. 11 provides a schematic illustration of the surgical navigation system. The surgical navigation system 100 includes display 102 for rendering a stereoscopic image 104 (or one or more stereoscopic images) of a portion of a subject 105 (e.g., a patient) that can be viewed with stereoscopic viewing glasses 112. The surgical navigation system 100 also includes computer processor component 108 that includes a CPU, input/output interface, memory, and a storage device as set forth above. In a refinement, the surgical navigation system 100 also includes tracking system 110 optionally mounted to display 102 that can monitor the location and orientation of stereoscopic viewing glasses 112, probe 120, and optionally hand gestures from a user 122 (e.g., a surgeon or other healthcare professional). Motions and actions of pointing device 120 are reflected on display 102 as a pointer cursor, as set forth below. Keyboard 124 can be used to input commands and other information into the computer system. The surgical navigation method includes a step of receiving image data having a discrete spatial resolution for medical images in a subject 105. The image data can include CT, MRI, PET, mammography, ultrasound, or photoacoustic image data. First stereoscopic image 104 (or one or more stereoscopic images) is rendered on display 102 from the image data. The first stereoscopic image (or one or more stereoscopic images) includes image parallax. Input from a probe 120 allows localizing of the probe in the first stereoscopic image 104. In should be appreciated that probe 120 is a type of pointing device. Probe 120 also allows manipulation of the first stereoscopic image 104 in three-dimensional space while maintaining proper three-dimensional spatial relationships, the probe interacting with and manipulating the first stereoscopic image in three-dimensional space with six degrees of freedom to observe its spatial relationship of different organ structures. In a refinement, probe 120 includes fiducials that allow determination of position and orientation of the probe, or the system uses hand gesture as the pointing device. The probe 120 can also have button(s) and/or other means to directly communicate with the computer either through wired or wireless connections. In another refinement, the operator's head motion and/or eye movement will be tracked and the stereoscopic images will be updated accordingly. In another refinement, the 3D stereoscopic image can be registered onto the images of an actual subject and superimposed onto the actual subject's images on stereoscopic display or head-mounted display. In a further refinement, head-mounted display(s) have cameras to track eye movement and head motion or position and super impose 3D images onto ambient environment view so that 3D stereoscopic images will update accordingly.

In a variation, a user simulating the surgical procedure is able to determine an optimal surgical path. In this regard, the user can also define a potential surgical path or surgical corridor in the first stereoscopic image 104 (or one or more stereoscopic images). Advantageously, the white matter fibers that pass through the surgical path or corridor will be highlighted. As the user adjusts the location of the surgical path or surgical corridor, highlighting of the fibers passing through the surgical path or corridor are updated. In a further refinement, the system reminds the user through sound or motion alarm 105 on monitor 102, that the surgical path or surgical corridor intersects pre-defined white matter tracts, vessels or target regions. In a refinement, a procedure will be initiated to alarm the operator (e.g., the user) in the event of surgical operation deviates from the predefined surgical path or surgical corridor. Moreover, a procedure will be initiated to alarm the operator in the event of surgical operation interacts with a predefined structure that is superimposed onto the surgical view. During the planning of the surgical path, the user can follow through the surgical path or surgical corridor to mimic the microscopic view of the inside of a patient's body and/or organs. Advantageously, during the planning of a surgical path, the user can measure the size, distance, volume, diameter, and area of any part of an organ in 3D space.

In a variation, the method further includes a step of detecting the location, orientation, and body position of a subject to register the first stereoscopic image to an actual physical location in the subject corresponding to the first stereoscopic image. The subject's location can be registered to positions in the stereoscopic images by any number of techniques known to those skilled in the art. For example, fiducials markers can be attached on the subject head and then do CT scan. The tracking system 110 detects the location of these fiducial markers in real-time and then registers these fiducial markers onto displayed images. For this purpose, the tracking system 110 includes a camera. Subject body locations in real space are mapped onto the displayed images in imaging space. In another registration method, a camera detects the location and orientation of the subject body. A hand-held scanner is then used to scan the forehead or other anatomical landmark locations so that the computer can register the subject's images with his/her actual location.

In a further refinement, probe 120 is positioned in the subject during surgery to access an actual location of the probe in the subject and further register (i.e., map) this location onto the first stereoscopic image and any additional stereoscopic images (i.e., the stereoscopic images). The stereoscopic images are superimposed onto the image of an actual surgical view to form revised stereoscopic images. These revised stereoscopic images are displayed on a stereoscopic screen to be viewed with polarized glasses, head-mounted displays or surgical microscopes. During surgery, the user could interact and manipulate the 3D stereoscopic objects to see spatial relationships between different organ structures. Moreover, a user can further simulate surgery on the 3D stereoscopic objects to determine the optional surgical route. With the assistance of the probe, the actual surgical path being employed is determined and reconstructed onto the stereoscopic images. Therefore, an adjustment to the previously planned or suggested surgical path can be provided. To overcome the misregistration between actual body shape and 3D stereoscopic images due to body structure deformation during surgery, probe 120 allows the user to map actual anatomical locations on the real subject to the locations on 3D stereoscopic images to assist computer to register the 3D stereoscopic images to the real object. In a refinement, the anatomical locations include anatomical land markers, important bone structures, facial bones, facial surfaces and facial profile, typical vessel structures, typical brain sulcus, and brain gyms.

As a surgical procedure progresses, this correction of registration could be performed repeatedly. For example, when a patient body or skull is open, the brain or body organ will deform, thereby resulting in deviations from the original images. Application of probe 120 at different points on the real location allows a mapping to corresponding points on the images. The navigation system 100 can then deform the images to register to the actual body shape.

In a variation, the probe can be natural hand(s) that allow determination of hand and finger gestures and positions.

In a variation, the probe has buttons and power source, either wired or wireless, to communicate with a computer for duplex communication.

In another variation, a user can initiate a procedure to communicate with a surgical microscope to retrieve the surgical view in real-time. Typically, the surgical view is co-registered with stereoscopic images or predefined surgical paths or surgical corridors to form a set of revised stereoscopic images. In a refinement, a user simulates a surgical procedure to determine a surgical path or surgical corridor or load a pre-defined surgical path or surgical corridor in the set of revised stereoscopic images in 3D space with 6 degrees of freedom. In a further refinement, a surgical path or surgical corridor can be superimposed on the set of revised stereoscopic images to first stereoscopic image or any additional stereoscopic image. In another refinement, a user selecting important structures of interest, including vessels, white matter tract fibers, to superimpose them along with surgical path or surgical corridor onto the revised stereoscopic images to form a set of integrated stereoscopic images. In still another refinement, while a user adjusts location or shape of the surgical path or surgical corridor in the second or third stereoscopic image, highlighting of white matter tracts and fibers and/or blood vessels passing through the surgical path or corridor are updated. The revised stereoscopic images are displayed on the stereoscopic screen to be viewed with polarized glasses, head-mounted displays or surgical microscopes.

In another variation, a user initiates a procedure to retrieve the surgical view from the microscope in real-time and send further processed surgical view back to a microscope 126 for display in 3D stereoscopic space and also in real-time.

In still another variation, a user can send back part of the third or second set of integrated images back to the surgical microscope or exoscope to display in 3D stereoscope.

In still over variations, a user initiates a procedure to communicate with an existing surgical navigation system to retrieve the information of a current location of a surgery and surgical course.

In a variation, anatomical landmarks of the subject are used to detect and calculate physical location (including facial bones, facial profile, important bone structures, blood vessels, sulcus, gyms) orientation, and body position of the subject under surgery to register the first stereoscopic image to an actual physical location in the subject to form a revised stereoscopic image. The anatomical landmarks of the subject can include facial bones, facial profile, important bone structures, blood vessels, sulcus, gyms and others. In a refinement, the methods set forth above further includes a step of super-imposing the revised stereoscopic image onto the subject under surgery to match the corresponding body organ and structure. In a refinement, a user plans surgical trajectory or surgical corridor in the revised stereoscopic image which is superimposed on the subject under surgery. Advantageously, the surgical trajectory or surgical corridor is used as a guidance for medical professional to decide the location and size of surgical entry and size, depth, and orientation of surgical operation. In a variation, the methods set forth above apply a procedure to constantly use newly available landmarks that are exposed during surgery to revise registration of the first stereoscopic image to an actual physical location in the subject, either automatedly or with user assistance, to overcome a mismatch between the registered stereoscopic image and a subject's real physical location and body structure.

In some variations, a user initiates a procedure to co-register and also integrate the subject's medical image with the same person's surgery location information retrieved from the surgical navigation system and surgical view retrieved from microscope to form a new set of images. In a refinement, a user simulates a surgical procedure or adjusting the preloaded surgical corridor to determine an optimal surgical path or surgical corridor and further superimpose the surgical corridor to the existing stereoscopic images.

In another variation, a user can initiate a procedure to communicate with a surgical microscope to retrieve a surgical view and send revised image back to microscope for display, both in real time. In a refinement, anatomical structures of the subject under surgery, including bone structures, skull, facial profile, blood vessels, bones, sulcus and gyms, or fiducials markers attached on a body organ are used as landmarks to register the first stereoscopic image with and/or superimpose onto the surgical view retrieved from microscope. In a refinement, a surgical view is co-registered with stereoscopic images or predefined surgical paths or surgical corridors to form a set of revised stereoscopic images.

In a variation, the methods set forth above are adapted to utilize a procedure to constantly use newly available landmarks to further revise registration of the first stereoscopic image to surgical view from microscope of the subject, either automatedly or with user assistance, to overcome a mismatch between the registered stereoscopic image and a subject's surgical view.

In another variation, the user can send back part of the set of revised stereoscopic images or the set of integrated 3D stereoscopic images back to the surgical microscope or exoscope to display in 3D stereoscope in real time The following examples illustrate the various embodiments of the present invention. Those skilled in the art will recognize many variations that are within the spirit of the present invention and scope of the claims.

1. Implementation of Fiber Visualization as 3D Stereoscopic Images

Figure 12A:
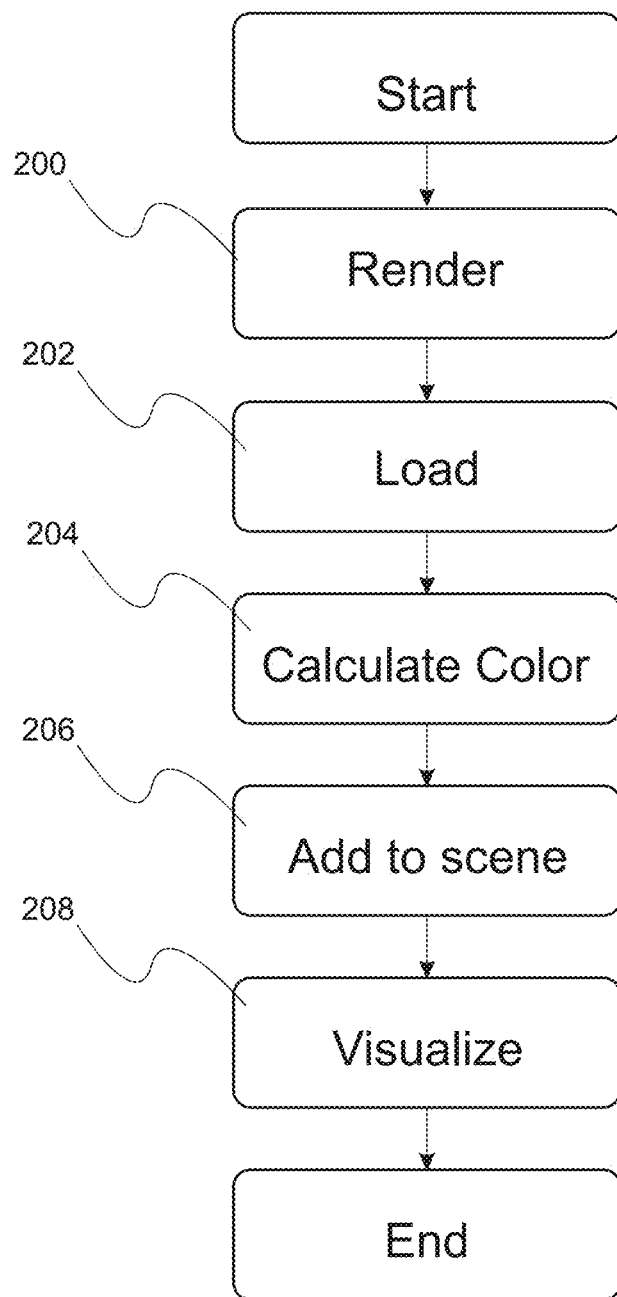
FIG. 12A provides a flowchart demonstrating the workflow of white matter fiber visualization in a 3D scene.

FIG. 12A illustrates the workflow of white matter fiber visualization in a 3D scene. The procedure is described as follows. In this context, a "line-set" is a set of white matter fibers or fiber tracts in 3D space. In step 1 represented by Box 200, the diffusion imaging data is co-registered with structural imaging data, then reconstruct the white matter fiber tracts of the whole brain or central nervous system, based on the water diffusion characteristics of each voxel and between voxel connectivity. These fiber tracts will be defined as the line-sets for later 3D visualization. The location or coordinates of the fiber tracts are well aligned with its corresponding structural images (e.g., T1/T2/FLAIR/SWI/PWI data).

TABLE 1

Psedudo code: Algorithm 1 Loading reconstructed fibers

```
function LOAD (filename)
    if isValid(filename) then
        (raw, info) = READ(filename)
    else
        ThrowIllegalException("Invalid file name")
    end if
end function
```

As depicted in box 202, line-sets are loaded from reconstructed fiber tract files and store the data into a specialized data structure in step 2. Each line-set, along with all the vertices, is loaded into a defined data structure. Table 1 provides a pseudocode for the loading of reconstructed fibers.

Figure 12B:
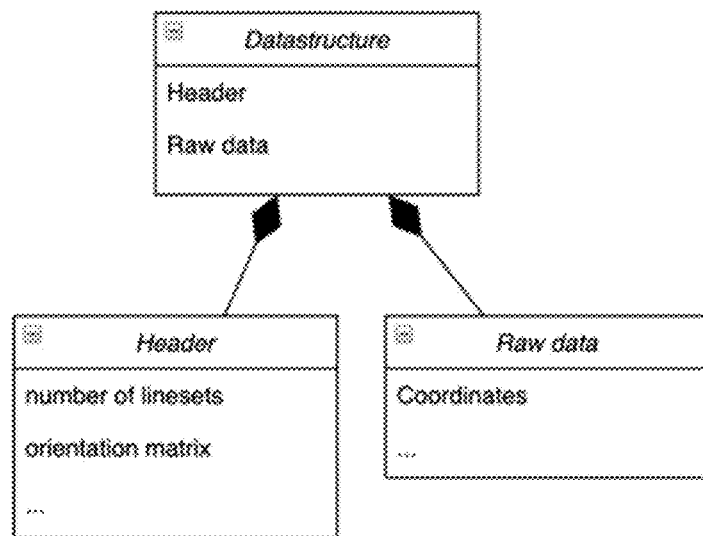
FIG. 12B provides an illustration of imaging data with structural imaging data.

FIG. 12B provides a schematic of the data structure. In this data structure, the number of line-sets, orientation matrix, coordinates of each vertex, etc. are stored. As represented by Box 204, color is calculated for each line-set (white matter fiber) based on the orientation of each line in step 3. Here, the white matter fibers can be color encoded based on their spatial orientation. The orientation (direction) for each segment of the line-set is calculated:

$$\vec{direction} = normalize(coordinate_{prev} - coordinate_{prov})$$

The averaged direction among all segments is calculated by:

$$\vec{averageDirection} = \sum_{i=1}^{n} \vec{direction}_i \div n$$

The difference between each lineset direction and average direction is calculated by:

$$\vec{diffDirection} = \sum_{i=1}^{n} (\vec{direction}_i - \vec{averageDirection})$$

Finally, color for current line-set (fiber) is calculated by:

color=diffD $$\vec{i}rection \div max(diffDirection_x, diffDirection_y, diffDirection_z)$$

Table 2 provides an example of pseudo-code for calculating fiber color.

TABLE 2

Psedocode: Algorithm 2 Calculating fiber color

```
function CalculateColor(raw, info)
    for trackIndex = 0 to numberOfTracks do
        numberOfVertices = getNumberOfVerts(raw, info, trackIndex)
        sumDirection = 0
        for i = 1 to numberOfVerts do
            direction = calculateDirection(vert – 1, vert )
            sumDirection = sumDirection + direction
        end for
        avgDirection = sumDirection / numberOfVerts
        color = (0, 0, 0)
        for i = 0 to numberOfVerts do
            color += diff(vertCoordinate[i], avgDirection)
        end for
        color = color / max(color.r, color.g, color.b)
        set(colors, trackIndex, color)
    end for
end function
```

Figure 12C:
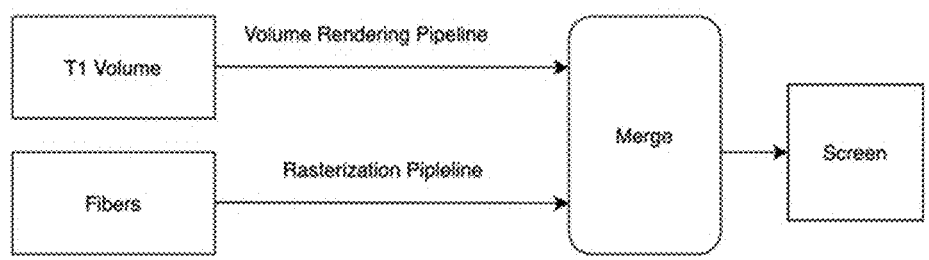
FIG. 12C provides a flowchart showing the rendering of the fibers (line-sets) by providing the pipeline with coordinates and colors.

Referring to FIG. 12C, the fibers (line-sets) are rendered by providing the pipeline with the coordinates loaded at Step 2 and colors loaded at Step 3, as represented by Box 204. The coordinates of the fibers are already co-registered with structural imaging data, e.g. T1 volume MRI data or any other structural images. As represented by Box 206, the result is rendered on a display screen in accordance with the pseudo-code of Table 3.

TABLE 3

Pseudocode: Algorithm 3 Render result on screen

```
function RENDER( )
    prepare(raw, info, colors)
    addToScene( )
    visualize( )
end function
```

2. Implementation of Fiber Tracking Using Stylus in 3D Stereoscope

Figure 13A:
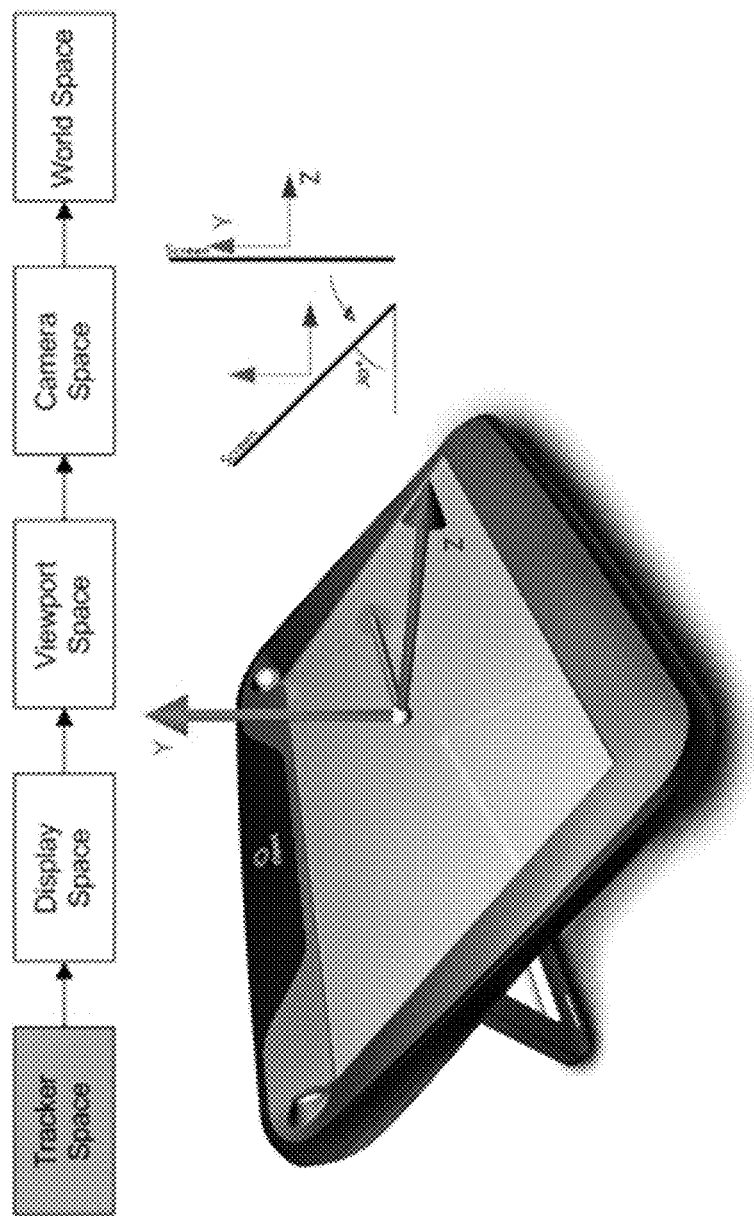
FIG. 13A provides an illustration showing fiber tracking using a stylus.
Figure 13B:
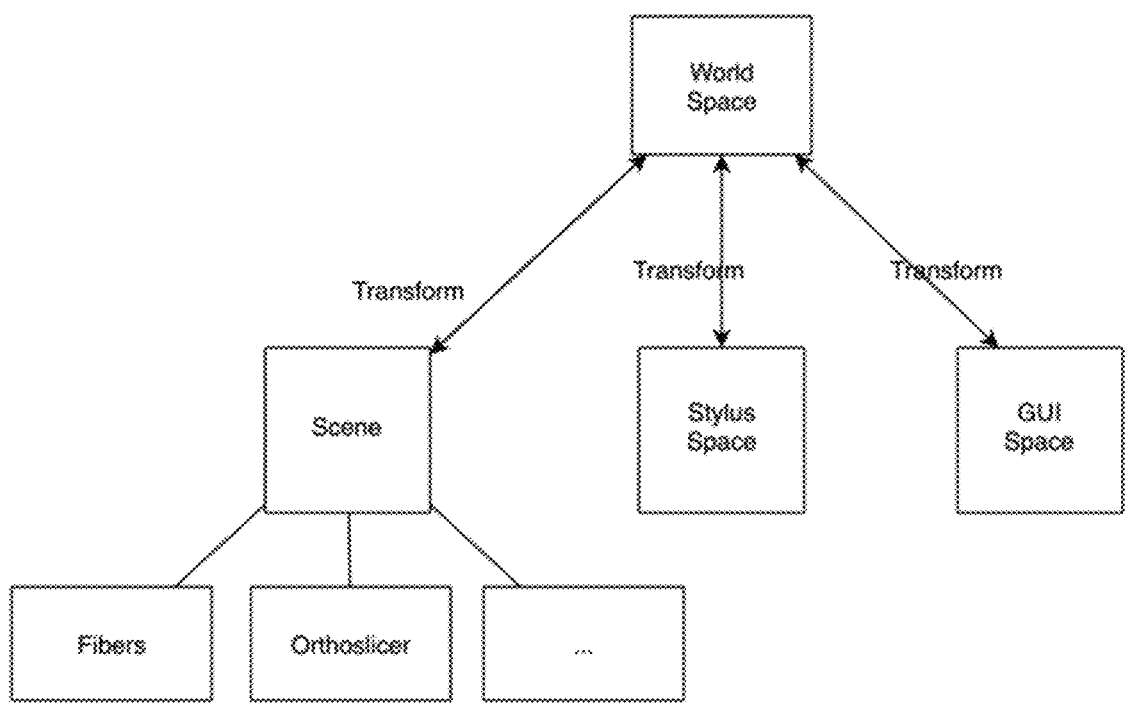
FIG. 13B provides the transformation hierarchy of a rendered scene.

Referring to FIG. 13A, a schematic showing fiber tracking using a stylus is depicted. the local transformation of the physical stylus is always tracked by two cameras, the data can be retrieved by tracking the location of the stylus. The stylus has markers that can be identified by the cameras in infrared light. A virtual 3D space is defined at the front space of the display. The location of the stylus is transformed into this virtual space to determine its interaction with other objects in the same space. The transformation hierarchy of the scene is defined in FIG. 13B. In this regard, the workflow is as follows:

1. Get the local transform matrix of the stylus by extracting the camera tracking information.

$$M_{transform} = \begin{bmatrix} x_0 & x_1 & x_2 & t_x \\ y_0 & y_1 & y_2 & t_y \\ z_0 & z_1 & z_2 & t_z \\ 0 & 0 & 0 & 1 \end{bmatrix}$$

2. Calculate transformation matrix from camera space to fibers' local space $$M_{result} = M_{stylus} * M_{window} * M_{scene} * M_{fibers}$$

3. Calculate the top and the tip of the stylus beam based on its length $$Coordinate_{tip} = M_{result} * Coordinate_{initialTip}$$

4. Use the calculated position of the stylus beam to determine if the beam is interacting with any fibers in the scene if so, trigger the corresponding event. The algorithm for intersection testing and the trigger event is provided in Table 4.

TABLE 4

Algorithm 1 Intersection testing and trigger event

```
function intersect(stylus, fibers)
    results = NULL
    for fiber in fibers
        if intersect(stylus, fiber) then
            results.add(fiber)
        end if
    end for
    if results equals NULL then
        return
    end if
```

TABLE 4-continued

| Algorithm 1 Intersection testing and trigger event |
|---|
| closest = findClosestResult(results) |
| trigger(closest) |
| end function |

3. Implementation of Boolean Operations of Fiber Tracking (AND, OR, NOT) in 3D Stereoscope The Boolean Operations of fiber tracking (AND, OR, NOT) are implemented as follows:
  i) Each line-set will be assigned to a unique ID, along with its coordinates, when loaded

| Fiber |
|---|
| uid coordinates | ii) When fibers are extracted by a region of interest (ROI), which could be a sphere or any shape of container. The ROI has ID in its data structure for the linesets passing it.

| RoI |
|---|
| Extracted_uIds |
| All_uIds | iii) Each ROI will have a reference to the IDs of the whole fiber dataset (all_uIds).

3.1 OR Operation

FIG. 7B illustrates that the fibers passing through either ROI will be jointly highlighted/displayed on the scene. In algorithm implementation provided in Table 5, the program will combine IDs from two RoIs into a new object.

TABLE 5

| Algorithm 1: OR operation between two ROIs |
|---|
| function OR(r_1, r_2) |
| (size_1, ids_1) = r_1.getIds( ); |
| (size_2, ids_2) = r_2.getIds( ); |
| ids_result = NULL; |
| i_1 = 0; |
| i_2 = 0; |
| while i_1 < size_1 AND i_2 < size_2 |
| if ids_1[i_1] < ids_2[i_2] |
| ids_result.add(ids_1[i_1++]) |
| else if (ids_1[i_1] > dis_2[i_2]) |
| ids_result.add(ids_2[i_2++]) |
| else |
| ids_result.add(ids_1[i_1]) |
| i_1++ |
| i_2++ |
| end if |
| end |
| while i_1 < size_1 |
| ids_result.add(ids_1[i_1++]) |
| end |
| while i_2 < size_2 |
| ids_result.add(ids_2[i_2++]) |
| end |
| return ids_result |
| end function |

3.2 And Operation

FIG. 6A demonstrates that fibers only passing both ROIs will be visualized in the scene. In algorithm implementation Table 6, it will find out the common IDs between two RoIs and generate a new RoI with these IDs.

TABLE 6

| Algorithm 2: AND operation between two RoIs |
|---|
| function AND(r_1, r_2) |
| (size_1, ids_1) = r_1.getIds( ); |
| (size_2, ids_2) = r_2.getIds( ); |
| ids_result = NULL; |
| i_1 = 0; |
| i_2 = 0; |
| while i_1 < size_1 AND i_2 < size_2 |
| if ids_1[i_1] < ids_2[i_2] |
| i_1++ |
| else if (ids_1[i_1] > dis_2[i_2]) |
| i_2++ |
| else |
| ids_result.add(ids_1[i_1]) |
| i_1++ |
| end if |
| end |
| return ids_result |
| end function |

3.3. NOT Operation

FIG. 7A illustrates the NOT operation of fiber tracking. On the left panel, both darker fibers and lighter fibers (in an actual application, these fibers have different colors) pass the first ROI. On the right panel, the fibers that pass the second ROI are deleted from the scene, meaning that the fibers that pass the first ROI but NOT the second ROI will be displayed in the scene. In the algorithm implementation provided in Table 7, the program will calculate the IDs in one ROI while not in the other ROI then generate RoI with these IDs.

TABLE 7

| Algorithm 3: MINUS operation between two RoIs |
|---|
| function MINUS(r_1, r_2) |
| (size_1, ids_1) = r_1.getIds( ); |
| (size_2, ids_2) = r_2.getIds( ); |
| ids_result = NULL; |
| i_1 = 0; |
| i_2 = 0; |
| while i_1 < size_1 |
| if i_2 >= size_2 |
| ids_result.add(ids_1[i_1]) |
| else |
| while (i2 < size_2) |
| if (ids_1[i_1] < ids_2[i_2]) |
| ids_result.add(ids_1[i_1]) |
| break |
| else if (ids_1[i_1] > ids_2[i_2]) |
| i_2++ |
| else |
| i_2++ |
| break |
| end if |
| end |
| ids_result.add(ids_1[i_1]) |
| end function |

3.4. Summary of Binary Operations.

As shown in FIG. 5A, a user can track white matter fibers by using the tracking stylus in the following steps.
  1. Moving fibers to the desired position in the 3D space
  2. Using function key to change current regions of interest (ROI) type to certain Boolean functions, including AND, OR, or NOT.
  3. Calculating the result between the current bundle (which is actually an ROI) and the current marker (which is another ROI) by using the algorithm mentioned in Binary Operations.
  4. Creating a group of temporarily extracted fibers for preview.

5. Adding temporarily extracted fibers to the result once the user clicks the primary button.

In FIG. 5A, fibers passing through the tracking ball are highlighted as white color; Right: stylus beam (in red) to be used to place tracking ball.

4. Joint Visualization of Both Structural Images and White Matter Fibers

Figure 14:
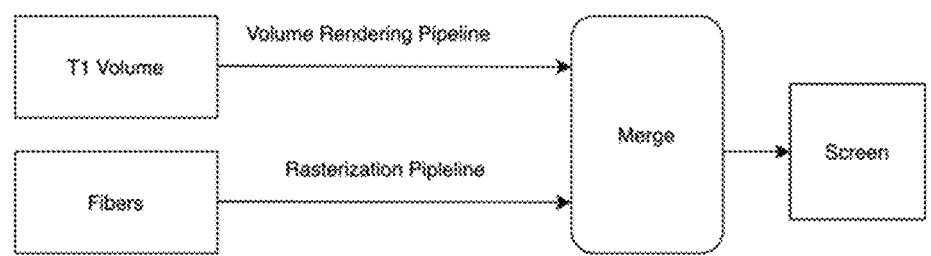
FIG. 14 shows a flowchart of the Hybrid rendering of both structural and fiber data into a scene.

Structural imaging data (e.g., T1/T2/FLAIR/SWI/PWI images) is visualized by using volume rendering and ray casting techniques. White matter Fibers are rendered using classic rasterization pipeline. A hybrid rendering technique could be used to render both structural imaging data and fibers in the scene in 3D space. Since the fiber data and structural images are co-registered previously, these two datasets will be well aligned and visualized in the 3D scene. As a result, the fibers are superimposed onto the structural images. FIG. 14 illustrates the hybrid rendering of both structural and fiber data into the scene.

4.1 Use Structural Image as a Reference for Fiber Tracking

Figure 15:
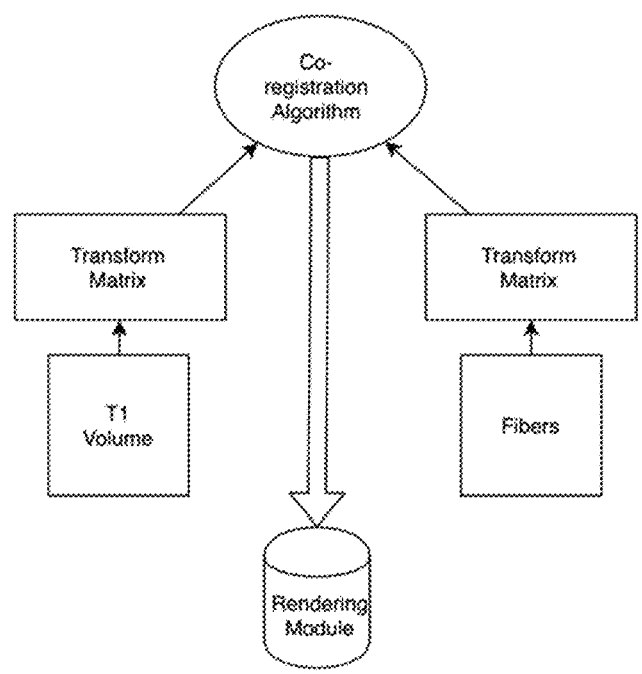
FIG. 15 shows a flowchart demonstrating the process of how structural and fiber data are co-registered and rendered together.

Since the fibers can be superimposed onto structural images in a well-aligned manner after co-registration, users can use structural landmarks as references to perform fiber tracking. FIG. 15 demonstrates the process of how structural and fiber data are co-registered and rendered together.

4.2 Use 2D Image Slices in 3D Orthogonal Plane (Orthoslicer) as Reference Plane for Fiber Tracking The workflow for the orthoslicer illustrated in FIGS. 3A and 3B is as follows.

1. Render orthoslicer
    a. Localize the center of image acquisition of the organ, which will also be used as the center of orthoslicer. This will be the starting poit of x, y, z coordinates.
    b. Render slices to xz-plane, xy-plane, and yz-plane based on the coordinate of center Algorithm: Render Orthoslicer

```
function RENDER(volume)
    center = orthoslicer.getCenter( )
    slices = extractFromVolumeData(center_x, center_y, center_z, volume)
    render(slice_xy, orthoslicer_xy)
    render(slice_xz, orthoslicer_xz)
    render(slice_yz, orthoslicer_yz)
end function
```

2. Render fibers. Same as above.
3. Render orthoslicer and fibers together (see, FIGS. 3A and 3B). Since the fibers and structural images are co-registered, the fibers are superimposed onto the 3D orthoslicers.
4. Move orthoslicer. When a user points stylus to any of the orthoslice, the user can drag the orthoslice to move it along its axis, which is perpendicular to the plane. The intersection between fibers and orthoslicer indicates the location of fibers. Therefore, the orthoslice could be used to help localize anatomical landmarks for fiber tracking.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method for providing adjustable three-dimensional (3D) rendering for surgical assistance, the method comprises:
    receiving image data having a discrete spatial resolution for medical images in a subject;
    rendering a first stereoscopic image on a display from the image data, the first stereoscopic image including image parallax; and
    receiving an input from a probe or hand gesture that allows rendering of the probe or hand in the first stereoscopic image, the probe or hand gesture also allowing manipulation of the first stereoscopic image in three-dimensional space while maintaining proper three-dimensional spatial relationships, the probe or hand gesture interacting with the first stereoscopic image in three-dimensional space with six degrees of freedom;
    displaying a first reference plane and a second reference plane that each independently intersect the first stereoscopic image such that the first reference plane has rendered thereon a first reference image and the second reference plane has rendered thereon a second reference image;
    receiving an input from a pointing device or hand gesture that selects positions of the first reference plane or the second reference plane wherein the first reference image and the second reference image update when their position or orientation change;
    a user initiating with the pointing device or hand gesture a rendering of a three-dimensional tracking container on the first stereoscopic image, wherein the three-dimensional tracking container is fixed to the first reference plane and/or the second reference plane such that the three-dimensional tracking container is movable in unison with user-directed movement of the first reference plane and/or the second reference plane.

2. The computer-implemented method of claim 1 wherein image data includes CT, MRI, PET, mammography, ultrasound, or photoacoustic image data.

3. The computer-implemented method of claim 1, wherein the probe could also be natural hand(s) that allow determination of hand and finger gestures and positions.

4. The computer-implemented method of claim 1 further comprising a user simulating a surgical procedure to determine a surgical path or surgical corridor in the first stereoscopic image wherein white matter tracts and fibers and/or blood vessels that pass through the surgical path or surgical corridor are highlighted and wherein as the user adjusts location of the surgical path or surgical corridor, highlighting of white matter tracts and fibers and/or blood vessels passing through the surgical path or surgical corridor are updated and wherein while the user follows through the surgical path or surgical corridor to mimic a microscopic view of a subject's body and/or organs.

5. The computer-implemented method of claim 1 wherein the probe is positioned in the subject during surgery to access an actual location of the probe in the subject and further map this location onto the first stereoscopic image or any additional stereoscopic images.

6. The computer-implemented method of claim 1, wherein the first stereoscopic image can be displayed on a polarized stereoscopic screen or head-mounted displays.

7. The computer-implemented method of claim 1, wherein cameras either as part of a display or independently provided to track position, orientation, and movement of the probe or hand gesture as well as body position, orientation, and location of the subject under surgery.

8. The computer-implemented method of claim 1 further comprising using anatomical landmarks, including facial bones, facial profile, important bone structures, blood vessels, sulcus, gyrus, of the subject to detect and calculate physical location, orientation, and body position of the subject under surgery to register the first stereoscopic image to an actual physical location in the subject to form a revised stereoscopic image, and further super-impose the revised stereoscopic image onto the subject under surgery to match a corresponding body organ and structure.

9. The computer-implemented method of claim 8, wherein a user plans surgical trajectory or surgical corridor in the revised stereoscopic image which is superimposed on the subject under surgery and wherein the surgical trajectory or surgical corridor is used as a guidance for medical professional to decide a location and size of surgical entry and size, depth, and orientation of surgical operation.

10. The computer-implemented method of claim 8 further comprising a procedure to constantly use newly available landmarks, that are exposed during surgery, to revise registration of the first stereoscopic image to the actual physical location in the subject, either automatedly or with user assistance, to overcome a mismatch between a registered stereoscopic image and a subject's real physical location and body structure.

11. The computer-implemented method of claim 8, wherein the probe has buttons and power source, either wired or wireless, to communicate with a computer for duplex communication.

12. The computer-implemented method of claim 1, wherein a user can initiate a procedure to communicate with a surgical microscope to retrieve a surgical view and send revised image back to microscope for display as a set of revised stereoscopic images, both in real time.

13. The computer-implemented method of claim 12, wherein anatomical structures of the subject under surgery, including bone structures, skull, facial profile, blood vessels, sulcus and gyrus, or fiducials markers attached on a body organ are used as landmarks to register the first stereoscopic image with and super impose onto the surgical view retrieved from microscope.

14. The computer-implemented method of claim 12 further comprising procedure to constantly use newly available landmarks, that are exposed during surgery, to further revise registration of the first stereoscopic image to surgical view from microscope of the subject, either automatedly or with user assistance, to overcome a mismatch between a registered stereoscopic image and a subject's surgical view.

15. The computer-implemented method of claim 12 further comprising a user simulating a surgical procedure to determine a surgical path or surgical corridor or load a pre-defined surgical path or surgical corridor in the set of revised stereoscopic images in 3D space with 6 degrees of freedom.

16. The computer-implemented method of claim 14, wherein a surgical path or surgical corridor is superimposed on the set of revised stereoscopic images.

17. The computer-implemented method of claim 14 further comprising the user selecting important structures of interest, including vessels, white matter tract fibers, to superimpose them along with surgical path or surgical corridor onto the set of revised stereoscopic images to form a set of integrated stereoscopic images.

18. The computer-implemented method of claim 14 wherein while a user adjusts location or shape of a surgical path or surgical corridor in the set of revised stereoscopic images or third set of integrated stereoscopic images, highlighting of white matter tracts and fibers and/or blood vessels passing through the surgical path or corridor are updated.

19. The computer-implemented method of claim 14, wherein the set of revised stereoscopic images is displayed on a stereoscopic screen to be viewed with polarized glasses, head-mounted displays or surgical microscopes.

20. The computer-implemented method of claim 14, wherein the user can send back part of the set of revised stereoscopic images or the set of integrated 3D stereoscopic images back to the surgical microscope or exoscope to display in 3D stereoscope in real time.

21. The computer-implemented method of claim 1, wherein if a surgical operation deviates from a predefined surgical path or surgical corridor, a procedure is initiated to alarm a user.

22. The computer-implemented method of claim 1, wherein if a surgical operation interacts with a predefined structure that is superimposed onto a surgical view, a procedure will be initiated to alarm a user.

23. The computer-implemented method of claim 1, wherein a user initiates a procedure to communicate with an existing surgical navigation system to retrieve information of a current location of a surgery and surgical course.

24. The computer-implemented method of claim 1, wherein a user initiates a procedure to co-register and integrate a subject's medical image with surgery location information retrieved from a surgical navigation system and surgical view retrieved from microscope to form a new set of images.

25. The computer-implemented method of claim 24 further comprising a user simulating a surgical procedure or adjusting a preloaded surgical corridor to determine an optimal surgical path or surgical corridor and further superimpose the surgical corridor to existing stereoscopic images and then send superimposed images to a microscope for display, in real time.

* * * * *